United States Patent
Blackwelder et al.

(10) Patent No.: US 10,224,854 B2
(45) Date of Patent: Mar. 5, 2019

(54) ACTIVE DAMPING OF SYNCHRONOUS GRID OSCILLATIONS USING PARTIAL POWER CONVERTER

(71) Applicant: Rolls-Royce North American Technologies Inc., Indianapolis, IN (US)

(72) Inventors: Mark Jon Blackwelder, Plainfield, IN (US); Paul M. Rancuret, Indianapolis, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 0 days.

(21) Appl. No.: 15/366,524

(22) Filed: Dec. 1, 2016

(65) Prior Publication Data

US 2018/0041155 A1 Feb. 8, 2018

Related U.S. Application Data

(60) Provisional application No. 62/370,930, filed on Aug. 4, 2016.

(51) Int. Cl.
*H02M 1/12* (2006.01)
*H02P 23/04* (2006.01)
(Continued)

(52) U.S. Cl.
CPC ............ *H02P 23/04* (2013.01); *H02J 3/24* (2013.01); *H02J 3/01* (2013.01)

(58) Field of Classification Search
CPC . H02M 2001/0025; H02M 2001/0009; H02M 3/33507; H02M 1/12; H02J 3/01; H02P 21/05; H02P 6/28
See application file for complete search history.

(56) References Cited

U.S. PATENT DOCUMENTS 4,731,571 A 3/1988 Donley
5,513,090 A 4/1996 Bhattacharya et al.
(Continued)

FOREIGN PATENT DOCUMENTS

CN 102148492 B 8/2014
CN 104601077 5/2015

OTHER PUBLICATIONS

Belaidi, R., et al., "Improvement of the electrical energy quality using a Shunt Active Filter supplied by a photovoltaic generator," dated 2011, pp. 522-530, Energy Procedia 6, © 2011 Published by Elsevier Ltd. (DOI: 10.1016/j.egypro.2011.05.060).

(Continued)

*Primary Examiner* — Thai Dinh
(74) *Attorney, Agent, or Firm* — Brinks Gilson & Lione

(57) ABSTRACT

Methods and systems are provided to damp oscillations in a synchronous alternating current (AC) grid. Current may be received from the synchronous AC grid through a phase of an n-phase supply line. The current received from the synchronous AC grid is supplied to a phase of the synchronous motor. A sub-harmonic oscillation may be detected in the current received from the synchronous AC grid. The sub-harmonic oscillation may be damped by: shunting a portion of the current away from the phase of the synchronous motor during a first time period in an upper-half of the sub-harmonic oscillation, and/or supplying compensation current from a partial power converter to the phase of the synchronous motor during a second time period in a lower-half of the sub-harmonic oscillation.

20 Claims, 11 Drawing Sheets

(51) Int. Cl.
*H02J 3/24* (2006.01)
*H02J 3/01* (2006.01)

(56) References Cited

U.S. PATENT DOCUMENTS

| | | | | |
|---|---|---|---|---|
| 5,677,832 | A * | 10/1997 | Tissier | H02J 3/01 307/105 |
| 6,670,721 | B2 | 12/2003 | Lof et al. | |
| 6,861,897 | B1 * | 3/2005 | Cheng | H02J 3/01 327/552 |
| 7,173,399 | B2 | 2/2007 | Sihler et al. | |
| 7,183,751 | B2 * | 2/2007 | Wu | H02J 3/1842 323/207 |
| 7,885,087 | B2 * | 2/2011 | Hsu | H02J 3/1842 363/41 |
| 8,193,756 | B2 * | 6/2012 | Jadric | F25B 49/025 318/448 |
| 8,525,465 | B2 * | 9/2013 | Chiu | G05B 19/39 318/437 |
| 8,890,454 | B2 * | 11/2014 | De Franciscis | H02P 9/10 318/400.01 |
| 9,083,234 | B2 * | 7/2015 | Shudarek | H02M 1/126 |
| 2005/0035815 | A1 | 2/2005 | Cheng et al. | |
| 2006/0028024 | A1 | 2/2006 | Franke | |
| 2011/0108085 | A1 | 5/2011 | Nelson | |
| 2011/0109085 | A1 | 5/2011 | Nelson | |
| 2013/0175871 | A1 | 7/2013 | Knüppel et al. | |

OTHER PUBLICATIONS

Prokop, L., et al., "3-Phase PM Synchronous Motor Vector Control Using a 56F80x, 56F8100, or 56F8300 Device," dated Jan. 2005, pp. 1-64, Design of Motor Control Application, Freescale Semiconductor Application Note, AN1931, Rev. 3, © 2005 Freescale Semiconductor, Inc.

Wens, M., et al. "Basic DC-DC Converter Theory," dated 2011, pp. 27-63, in Design and Implementation of Fully-Integrated Inductive DC-DC Converters in Standard CMOS, Analog Circuits and Signal Processing, © 2011 Springer Science+Business Media B.V. (DOI 10.1007/978-94-007-1436-6_2).

Extended European Search Report, dated Nov. 16, 2017, pp. 1-8, issued in European Patent Application No. 17171436.3, European Patent Office, Munich, Germany.

* cited by examiner

ACTIVE DAMPING OF SYNCHRONOUS GRID OSCILLATIONS USING PARTIAL POWER CONVERTER

CROSS-REFERENCE TO RELATED APPLICATIONS

This application is a non-provisional application of, and claims priority under 35 USC § 119(e) to, U.S. provisional application 62/370,930, "ACTIVE DAMPING OF SYNCHRONOUS GRID OSCILLATIONS USING PARTIAL POWER CONVERTER" filed Aug. 4, 2016, the entire contents of which are incorporated by reference.

TECHNICAL FIELD

This disclosure relates to synchronous alternating current systems and, in particular, to synchronous loads.

BACKGROUND

Synchronous electrical machines include synchronous electric motors and synchronous electric generators. A synchronous electric motor is an AC (alternating current) motor in which, at steady state, the rotation of the rotor is synchronized with the frequency of the supply current. In other words, the rotation period of the rotor at steady state may be equal to an integral number of AC cycles of the supply current. A synchronous generator may provide one or more synchronous motors with electrical power to spin the synchronous electric motors and any mechanical loads on the synchronous motors. Synchronous electrical machines produce (for example, motors) or consume (for example, generators) torque when the mechanical speed of their rotors multiplied by the number of machine pole pairs is equal to the electrical speed (frequency of the generated or supplied current) and the rotor and stator magnetic poles are misaligned.

Synchronous motors are not generally self-starting motors. Because a synchronous motor produces almost no torque when the rotor is not moving, the synchronous motor cannot accelerate to a substantially higher fixed supply current frequency without a supplemental mechanism. Synchronous motors commonly cannot self-start because connecting the nonrotating motor to the electrical grid at precisely aligned stator and rotor magnetic poles is impractical and because developing sufficient torque to accelerate the rotor to the fixed frequency of the electrical grid before the misalignment exceeds ninety degrees is impractical. Misalignment exceeding ninety degrees may cause the synchronous motor to stall. Indeed, accelerating torque decreases and becomes negative when the misalignment exceeds one hundred eighty degrees.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Innovative systems and methods for rotor pre-alignment prior to startup on a synchronous AC grid may be provided. One interesting feature of such systems and methods may be that partially-rated converters at load motors may be used to align rotors. When used, such converters may be smaller, lighter, and/or less expensive than fully rated converters. Alternatively, or in addition, an interesting feature may be that the systems and methods may improve the chances of the motors all synchronizing with a generator once startup begins.

Innovative systems and methods for assistance with rotor alignment during startup on the synchronous AC grid may be provided. One interesting feature of such systems and methods may be that partially-rated converters at load motors may assist during startup. Such partially-rated converters may be smaller, lighter, and/or less expensive than fully rated converters. Alternatively, or in addition, an interesting feature may be that the systems and methods, in some examples, may improve the robustness and likelihood of successfully starting synchronous motors.

Innovative systems and methods for damping non-modal oscillations may be provided. One interesting feature of such systems and methods may be that partially-rated converters at each load motor may actively damp torsional oscillations. Such converters may be smaller, lighter, and/or less expensive than fully rated converters. Alternatively, or in addition, an interesting feature may be that the systems and methods may damp torsional oscillations without knowledge of what the generator or other loads on the synchronous AC grid are doing. Alternatively, or in addition, an interesting feature may be that the systems and methods may damp torsional oscillations by shunting torque-producing currents oscillating at frequencies of interest may be cancelled by shunting such currents through a neutral point. Alternatively, or in addition, an interesting feature may be an improvement in the stability of a weak synchronous grid by damping the torsional oscillations.

Figure 1:
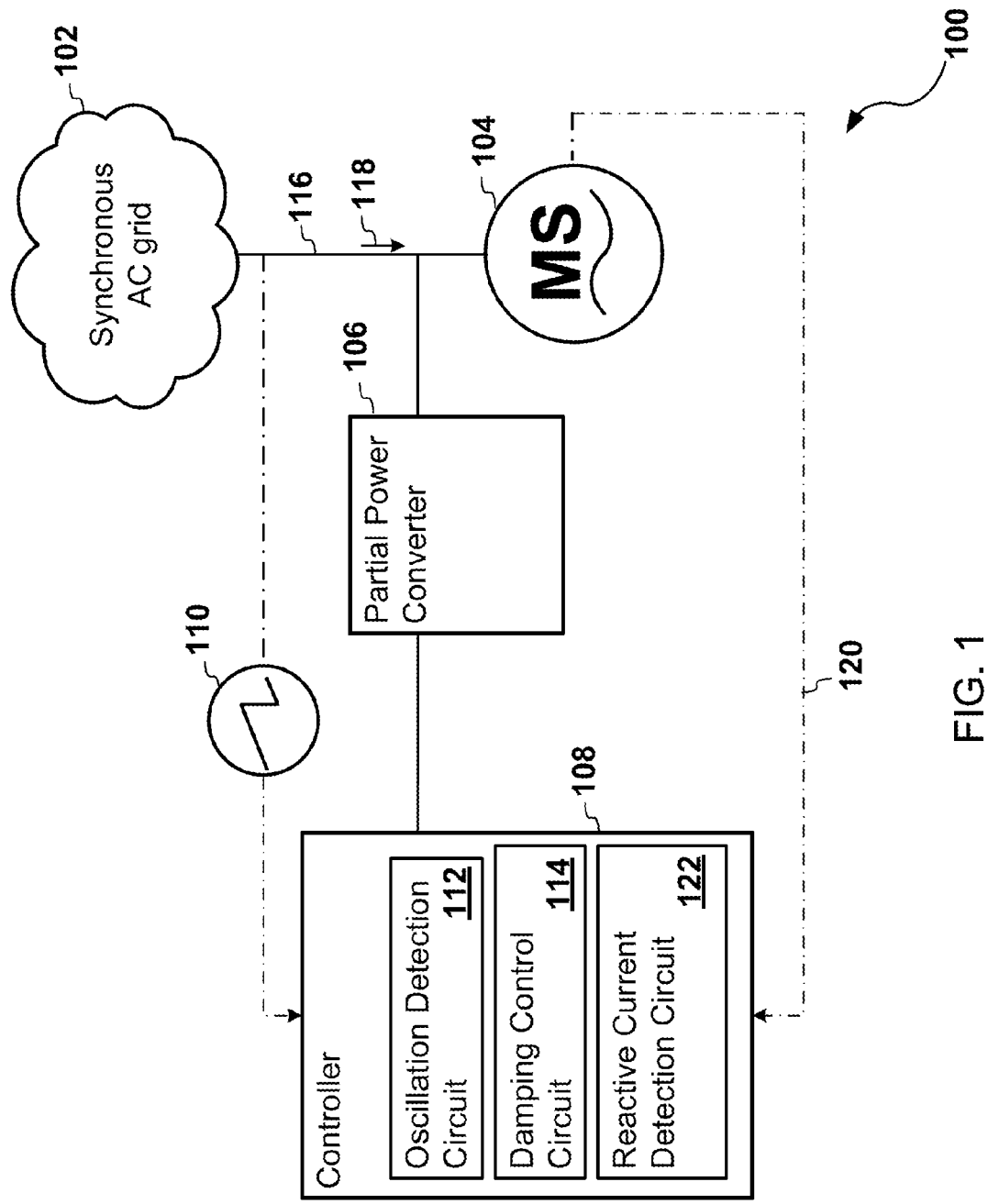
FIG. 1 is a logical block diagram of an example of a system for damping oscillations in a synchronous AC grid.

FIG. 1 is a logical block diagram of an example of a system 100 for damping oscillations in a synchronous AC grid 102. The system 100 illustrated in FIG. 1 includes a synchronous motor 104, a partial power converter 106, a controller 108 and a current sensor 110. The controller 108 may include an oscillation detection circuit 112, a damping control circuit 114, and a reactive current detection circuit 122.

The synchronous AC grid 102 may be an electrical grid that transports AC electricity from one or more synchronous generators (not shown) or other power sources to one or more synchronous motors, such as the synchronous motor 104 illustrated in FIG. 1. The synchronous aspect of the AC grid refers to matching the electrical output frequency of a generator or other power source to a corresponding electrical frequency of the synchronous motor 104 or motors. A rotor speed of a machine (synchronous motor or synchronous generator) is scaled by the number of pole pairs of the machine in question. In other words, the mechanical frequency in rotations per second of a rotor of a machine multiplied by the number of pole pairs of the machine equals the electrical frequency in Hertz of the machine. Accordingly, a machine on the grid having twice the pole pairs of another may have a rotor that physically rotates at half the speed of the other. In some examples, the fundamental frequency of the electricity transported by the synchronous AC grid 102 may vary over time. For example, as the synchronous generator starts up, the fundamental frequency of the electricity generated by the generator (and transported by the synchronous AC grid 102) may increase. For example, the fundamental frequency of the grid 102 may increase from zero to a target frequency. Alternatively, in some examples, the fundamental frequency of the grid 102 is fixed at a predetermined frequency. The grid 102 may comprise, for example, wires, lines, transformers, and/or connectors.

The grid 102 may be a "weak grid." A weak grid is a grid in which the voltage and/or the frequency of the electricity on the grid are not as constant as in a "stiff grid". In other words, fluctuations of the voltage and/or the frequency of the electricity on the grid may need to be accounted for in a weak grid. In contrast, for a stiff grid, changes in the load(s) may have a negligible effect on the voltage and fundamental frequency of the grid. In a weak grid, changes in load(s) may noticeably change the fundamental frequency and/or voltage of the grid. The changes in voltage may be caused by higher impedance and limited bandwidth of the grid power source; and the changes in frequency may be caused by power response limitations of the source. A weak grid may have a short circuit ratio (ratio of short circuit current to rated current) less than 10, for example. Sub-harmonic oscillations—or modes—may form in a weak grid, such as the grid 102 in FIG. 1, and may need to be damped or eliminated where possible. The sub-harmonic oscillations are any oscillations having a frequency lower than the fundamental electrical grid frequency of the grid 102. The fundamental electrical grid frequency of the grid 102 may or may not be an integer multiple of the frequency of a sub-harmonic oscillation. The sub-harmonic oscillations may be, for example, a function of motor and generator mechanical moments of inertia, the electrical frequency on the weak grid, and/or the impedance of the motor(s) and/or generator(s). Non-modal oscillations are oscillations having frequencies that are not integer multiples of the fundamental electrical grid frequency. Because any sub-harmonic oscillation has a frequency lower than the fundamental electrical grid frequency, any sub-harmonic oscillation is also a non-modal oscillation.

The synchronous motor 104 may be any synchronous motor. The synchronous motor 104 may be a motor that drives a propeller, a motor in a compressor, or a motor that drives any other mechanical load. The amount of torque needed to drive a load may be, for example, a continuous function of the angular speed of the rotor of the synchronous motor 104.

The partial power converter 106 may be any power converter configured to provide power on an "as needed basis" as opposed to continuously. The power rating of the partial power converter 106 may be less than the power rating of the load motor 104. In some examples, the partial power converter 106 may be a power converter that has a power rating that is substantially less than the load motor 104, which means the partial power converter 106 has a power rating that is more than 10 times less than the load motor 104. In one such example, the partial power converter 106 may have a power rating that is 50 times less than the load motor 104 (for example, the partial power converter may have a power rating of 2 kilowatts and the load motor 104 may have a power rating of 100 kilowatts). The partial power converter 106 may be any electrical or electromechanical device for converting electrical energy from one form to another, such changing the voltage, the current, and/or the frequency of electricity received by the partial power converter 106. The partial power converter 106 may be a semiconductor power converter configured to selectively add current to the synchronous motor 104 and/or to selectively route current away from the synchronous motor 104.

During operation of the system 100, current from the synchronous AC grid 102 may be received through an n-phase supply line 116. The n-phase supply line 116 may be a three-phase supply, a six-phase supply, a single phase supply, or have any other number of phases. The n-phase supply line 116 may be balanced. Alternatively or in addition, the n-phase supply line 116 may have a neutral, such as a fourth wire in a three-phase supply.

The current 118 received from the synchronous AC grid 102 may be supplied to the synchronous motor 104. The current 118 supplied to the synchronous motor 104 may include all or only a portion of the current received from synchronous AC grid 102. The motor 104 may rotate accordingly.

The current sensor 110 may measure the current 118 received from the synchronous AC grid 102. Alternatively or in addition, the current sensor measures current at any other node in the system 100 at which the current flowing through the node may include a sub-harmonic oscillation present on the synchronous AC grid 102. One example of the current sensor 110 may be an operational amplifier and a resister configured as a current sensor. Another example of the current sensor 110 may be a hall-effect current sensor.

The controller 108 may receive the current measurements from the current sensor 110. In some examples, the controller 108 may receive an indication 120 of the angular position of the rotor of the motor 104 from a rotor sensor. The rotor sensor may be in the motor 104, coupled to the shaft of the motor, or otherwise configured to obtain the indication 120 of the angular position of the rotor. The rotor sensor may be an analog Hall Effect sensor, a resolver, an encoder, or any other sensor that detects the indication 120 of the angular position of the rotor of the motor 104.

Figure 2:
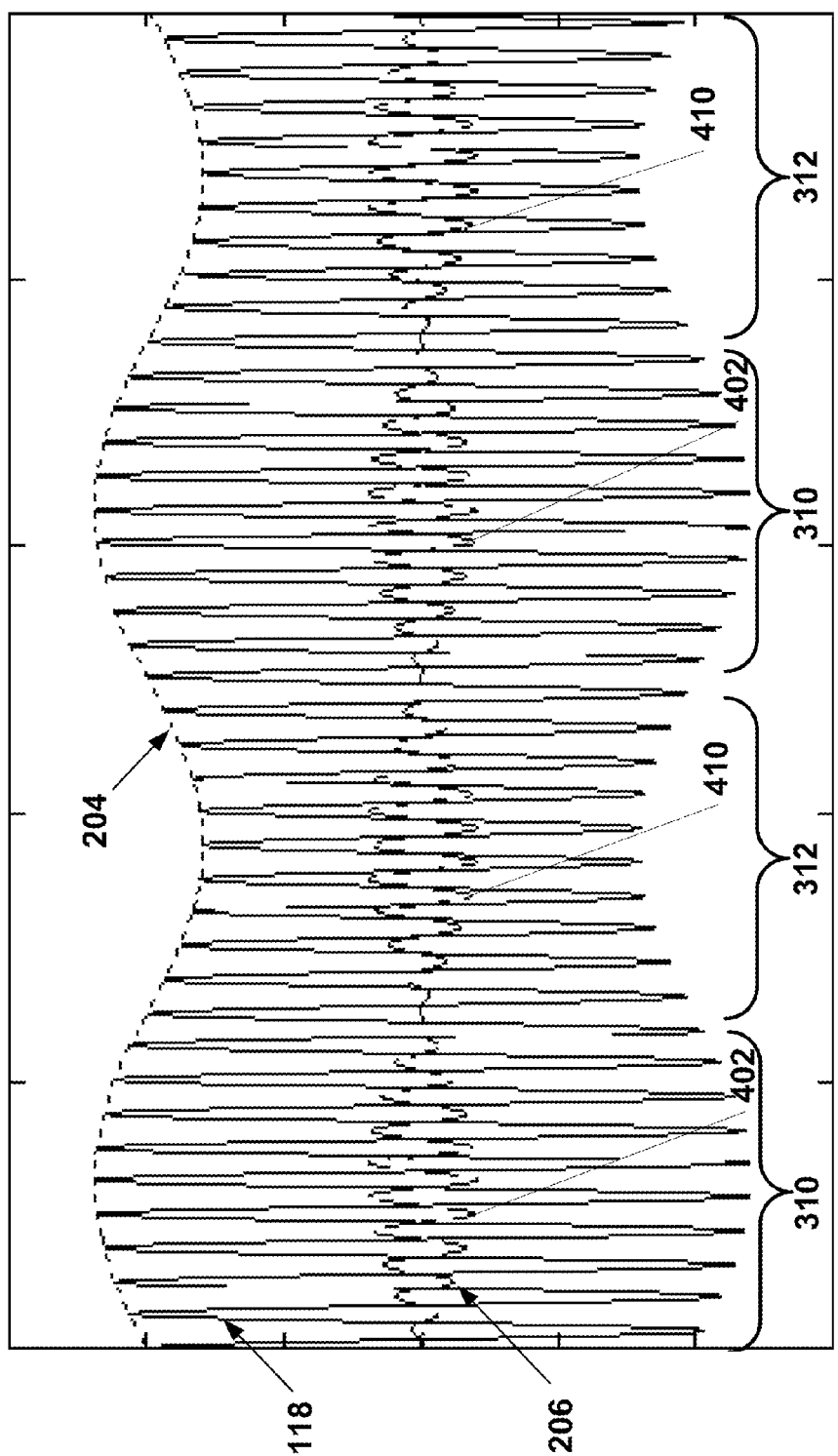
FIG. 2 illustrates a graph of an example of current received from the synchronous AC grid over time and a corresponding a damper current.

The oscillation detection circuit 112 of the controller 108 may detect a sub-harmonic oscillation in the current received from the synchronous AC grid 102 as described below. FIG. 2 illustrates a graph of an example of the current 118 received from the synchronous AC grid 102 over time. The current 118 shown in FIG. 2 is for one of the n phases supplied by the n phase supply line 116. The primary frequency of the current 118 is the fundamental current frequency of the grid 102. In the example shown in FIG. 2, the amplitude of the current 118 also varies over time according to a sub-harmonic oscillation 204. Unless addressed, the sub-harmonic oscillation 204 may cause the rotor of the motor 104 to wobble or perhaps even cause the motor 104 to stall. The oscillation detection circuit 112 may identify the sub-harmonic oscillation 204 with any control theory, neural networks, fuzzy logic, or model based predictor-corrector.

Figure 3:
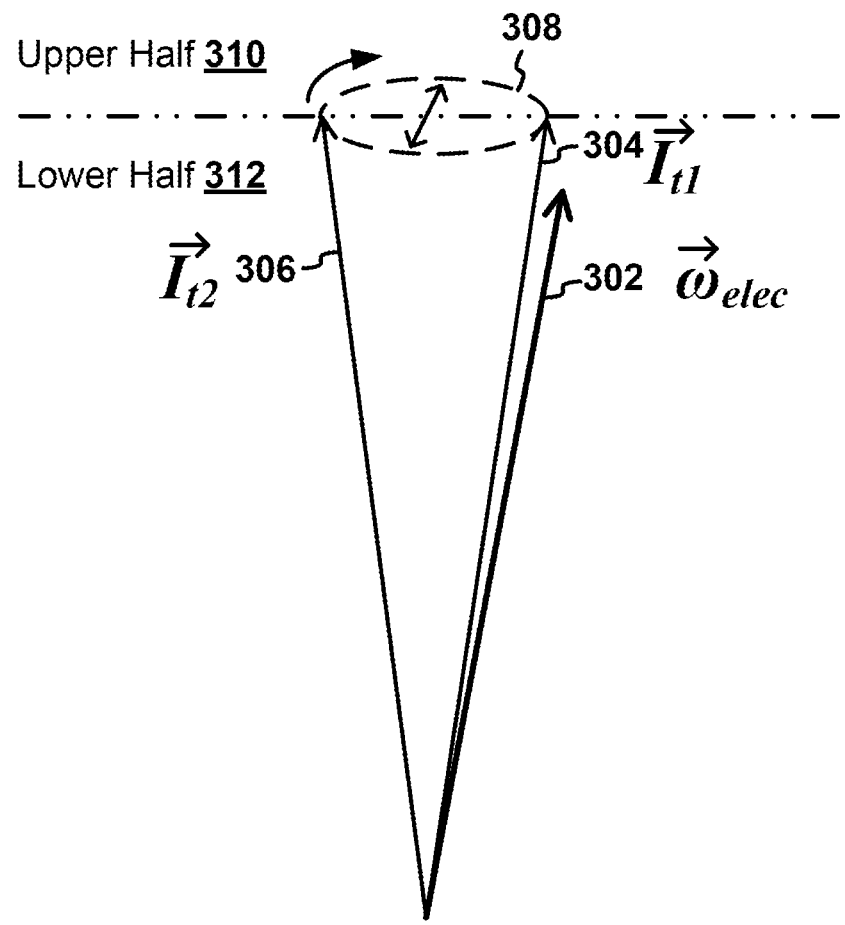
FIG. 3 illustrates an example of current measurements transformed from an n-phase entity into a two dimensional stationary frame.

FIG. 3 illustrates an example of the current measurements transformed from an n-phase entity into a two dimensional stationary frame using, for example, the Clarke transform. The current 118 received from the synchronous AC grid 102 is shown relative to a stationary frame at any arbitrary angle relative to the stator of the motor 104. The angular position 302 of the electrical angle of the motor 104 rotates about the origin in this stationary frame at the electrical frequency of the motor (ω elec). The angular position 302 of the electrical angle of the motor 104 may be referred to as the rotor electrical angle 302. The rotor electrical angle 302 may be a voltage vector derived from a transformation of voltage measurements at the phases of the n-phase supply line 116 into the two dimensional stationary frame using, for example, the Clarke transform.

The speed of rotation of the rotor electrical angle 302 is proportional to the mechanical rotational speed of the rotor of the motor 104. The relationship between the speed of rotation of the rotor electrical angle 302 and the speed of the rotor of the motor 104 is based on the number of pole pairs in the motor 104. Accordingly, the rotor electrical angle 302 is another example of the indication 120 of the angular position of the rotor of the motor 104.

Over time, the current vector 304, 306 traces an elliptical path 308 with respect to the rotor electrical angle 302. For example, the current vector 304, 306 may start at a position closest to the rotor electrical angle 302 at time 1, move to a position furthest from the rotor electrical angle 302 at time 2, and then move back again to the position closest to the rotor electrical angle 302. The current vector 304, 306 then repeats another cycle, tracing the elliptical path 308 again, and subsequently tracing the elliptical path 308 for each subsequent cycle. The cycle over which the current vector 304, 306 traces the elliptical path 308 represents a cycle of the sub-harmonic oscillation 204. Accordingly, the oscillation detection circuit 112 may identify the sub-harmonic oscillation 204 by detecting the elliptical path 308. In the example illustrated in FIG. 3, the phase of the current 118 received from the synchronous AC grid 102 relative to the rotor electrical angle 302 is an angle between the current vector 304, 306 and the rotor electrical angle 302 in the two dimensional stationary frame.

Stated a differently than in the preceding paragraph, time 1 may be the time at which an angle between the current vector 304, 306 and the rotor electrical angle 302 is smallest. Time 2 may be the time at which the angle between the current vector 304, 306 and the rotor electrical angle 302 is largest.

The current vector 304, 306 may trace the elliptical path 308 in a clockwise direction as shown in FIG. 3. In other examples, the current vector 304, 306 may trace the elliptical path 308 in a counter-clockwise direction. The path traced by the current vector 304 may have a different shape than the elliptical path 308 shown in FIG. 3 for some sub-harmonic oscillations. In the absence of any sub-harmonic oscillations, the current vector 304, 306 may remain at a constant angle to the rotor electrical angle 302.

Alternatively, the current measurements may be transformed from an n-phase entity into a current vector in a two dimensional rotating frame using, for example, the Park transform. The rotor electrical angle 302 (ω elec) may be mapped into the rotating frame at a constant angle. In such an example, the phase of the current received from the synchronous AC grid 102 relative to the rotor electrical angle 302 of the synchronous motor 104 is an angle between the current vector and the rotor electrical angle 302.

The angular position of the rotor with respect to the stator may not be precisely known in some examples. For example, the system 100 may not include the rotor sensor. Nevertheless, the angular position of the rotor may be represented by the n-phase voltage supplied to the motor 104. In other words, the angular position of the rotor may be represented as (or indicated by) the voltage supplied to the motor 104 transformed into two dimensions using, for example, the Clarke transform or the Park transform as described above. The current 118 received from the synchronous AC grid 102 may be calculated relative to a stationary or rotating frame of the voltage supplied to the motor 104 (transformed into two dimensions) instead of relative to the measured angular position of the rotor.

Alternatively, the oscillation detection circuit 112 may detect the sub-harmonic oscillations without knowledge of the rotor position or of the voltage representing the rotor position by using any technique for identifying harmonic oscillations in a signal. Nevertheless, the innovative methods and systems described above for detecting sub-harmonic oscillations based on the indication 120 of the angular position of the rotor of the motor 104 may be more accurate and/or effective under some circumstances. For example, the fundamental frequency of the grid 102, which may vary over time, may not always be apparent depending on what other frequency components exist in the current 118 received from the synchronous AC grid 102. Accordingly, if the oscillation detection circuit 112 uses a previously known technique to identify harmonic oscillations in a signal, the oscillation detection circuit 112, in some examples, may confirm the identity of the fundamental frequency by comparing with, for example, the rotational speed of the motor calculated from the measured angular positions of the rotor. The fundamental frequency is proportional to the rotational speed of the motor.

The damping control circuit 114 may cause the partial power converter 106 to damp of the sub-harmonic oscillation 204 detected by the oscillation circuit 112. The sub-harmonic oscillation 204 may be damped based on the phase of the current 118 received from the synchronous AC grid 102 relative to the angular position of the rotor of the motor 104. As explained in more detail below, the damping control circuit 114 may cause the partial power converter to supply and/or sink a damper current 206 that varies depending on the phase of the current 118 received from the synchronous AC grid 102 relative to the angular position of the rotor of the motor 104. An example of the damper current 206 for a phase is shown in FIG. 2 superimposed on the current 118 received from the grid 102 for the phase.

While the sub-harmonic oscillations may be damped without knowledge of the rotor position or the voltage representing the rotor position, there may be one or more advantages to damping based on the phase of the current 118 received from the synchronous AC grid 102 relative to the angular position 302 of the rotor of the motor 104. In some scenarios, an advantage may be that power may be regulated to a desired power factor (correction) in addition to damping oscillations. Alternatively or in addition, an advantage may be that the fundamental electrical frequency is known with greater certainty, so there is a greater certainty that a sub-harmonic is damped instead of the fundamental frequency.

Figure 4:
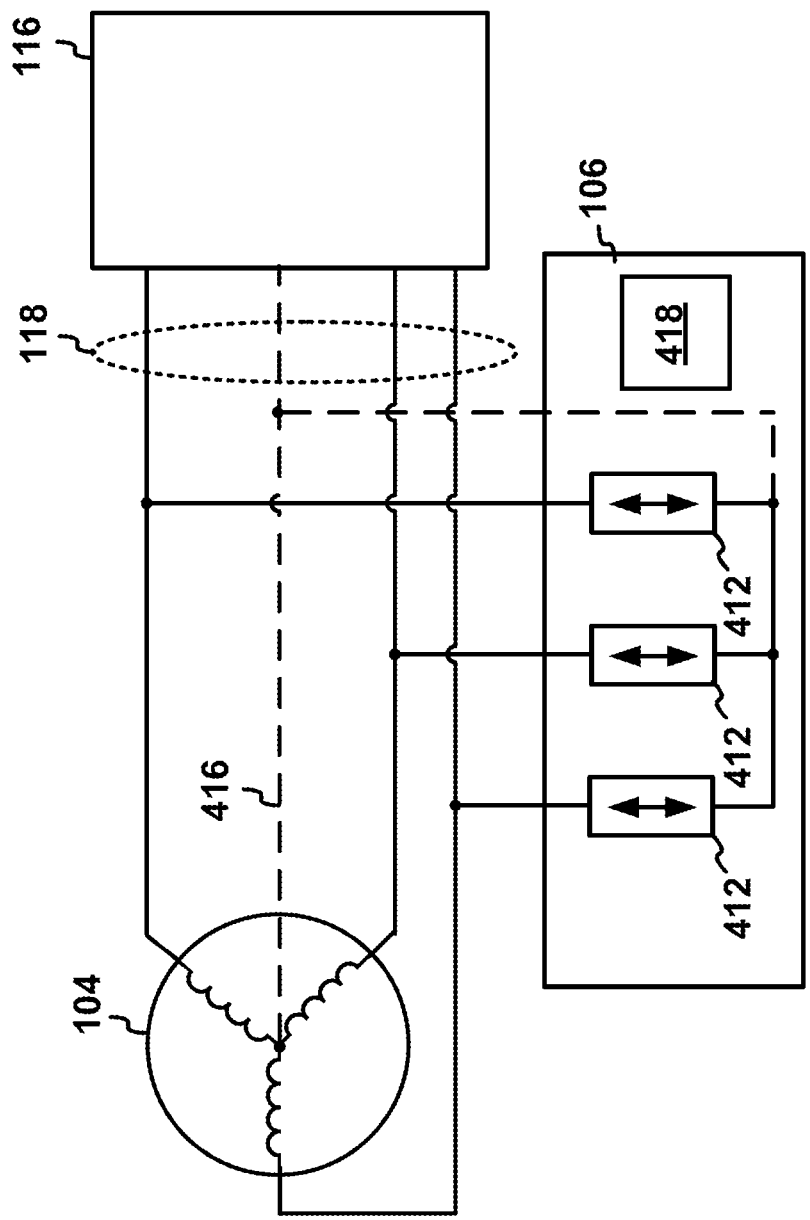
FIG. 4 includes a logical block diagram of an example a partial power converter.

To clarify the operation of the partial power converter 106 when damping the sub-harmonic oscillation 204, FIG. 4 includes a block diagram of the partial power converter 106. Each phase of the n-phase supply line 116 may be supplied to a corresponding phase of the motor 104. A neutral point connection 416 (shown as a dotted line in FIG. 4) between the motor 104 and the n-phase supply line 116 is optional if the phase currents are balanced. Because the currents for all of the phases add to zero in a balanced system, the neutral point connection 416 would carry no current, so it is unnecessary to have the neutral point connection 416 between the motor 104 and the n-phase supply line 116.

The partial power converter 106 may include one or more AC current sources 412 and a power converter controller 418. As shown in FIG. 4, each of the AC current sources 412 may be connected to a corresponding one of the phases supplied to the motor 104. In alternative examples, not every phase supplied to the motor 104 is connected to an AC current source. For example, only one of the phases may be connected to an AC current source of the partial power converter 106.

Each of the AC current sources 412 may be an electronic circuit that may supply and/or absorb an electric current that is independent of the voltage across the AC current source 412. The current supplied and/or absorbed may be controlled by the power converter controller 418 or any other controller. In the system 100, the current supplied and/or absorbed by each of the AC current sources 412 may be ultimately controlled or directed by the damping control circuit 114. The current supplied and/or absorbed by each of the AC current sources 412 is supplied to and/or adsorbed from the corresponding phase of the current 118 supplied to the motor 104 from the grid 102.

To damp the sub-harmonic oscillation 204, the damping control circuit 114 may direct each one of the AC current sources 412 to supply and/or absorb the damper current 206 to and/or from the corresponding phase. The damper current 206 may include a portion 402 of the current 118 received from the grid 102 on the corresponding phase that is shunted away from the motor 104 and adsorbed by the AC current source 412. Alternatively or in addition, the damper current 206 may include compensation current 410 that is added to the current 118 supplied to the motor 104 on the corresponding phase.

In the example illustrated in FIG. 2, the envelope of the damper current 206 may be defined by translating the line defining the sub-harmonic oscillation 204 down until the line is centered around the horizontal axis at zero, and rotating the translated line around the horizontal axis at zero. Alternatively, the amplitude of the damper current 206 may more or less than defined by rotating the translated line. The primary frequency of the damper current 206 may match the fundamental frequency of the current 118 received from the grid 102.

The AC current source 412 may shunt the portion 402 of the current 118 away from the synchronous motor 104 during a first time period within an upper-half 310 of the sub-harmonic oscillation 204. The upper-half 310 of the sub-harmonic oscillation 204 may be a time period during which the magnitude of the current vector 304, 306 exceeds the magnitude of the current vector 304, 306 at time 1 and time 2, which are described above in connection with FIG. 3. In contrast, the lower-half 312 of the sub-harmonic oscillation 204 may be a time period during which the magnitude of the current vector 304, 306 is less than the magnitude of the current vector 304, 306 at time 1 and time 2.

The first time period within the upper-half 310 of the sub-harmonic oscillation 204 may include all or just a portion of the upper-half 310 of the sub-harmonic oscillation 204. In the example illustrated in FIG. 2, the portion 402 of the current 118 is shunted away from the corresponding phase during the entire upper-half 310 of the sub-harmonic oscillation 204. The portion 402 of the current 118 shunted away may be 180 degrees out of phase with the current 118 received from the grid 102 on the corresponding phase of the n-phase supply line 116.

Alternatively or in addition, in order to damp the sub-harmonic oscillation 204, the damping control circuit 114 may direct the AC current source 412 to supply the compensation current 410 from the partial power converter 106. The compensation current 410 is added to the current 118 received from synchronous AC grid 102 on the corresponding phase of the n-phase supply line 116, and supplied to the synchronous motor 104. The AC current source 412 may supply the compensation current 410 during a second time period in the lower-half 312 of the sub-harmonic oscillation 204. The second time period may be all or a portion of the lower-half 312 of the sub-harmonic oscillation 204. In the example illustrated in FIG. 2, the compensation current 410 is supplied during the entire lower-half 312 of the sub-harmonic oscillation 204. The compensation current 410 supplied by the AC current source may be in phase with the current 118 received from the grid 102 on the corresponding phase of the n-phase supply line 116.

Figure 5:
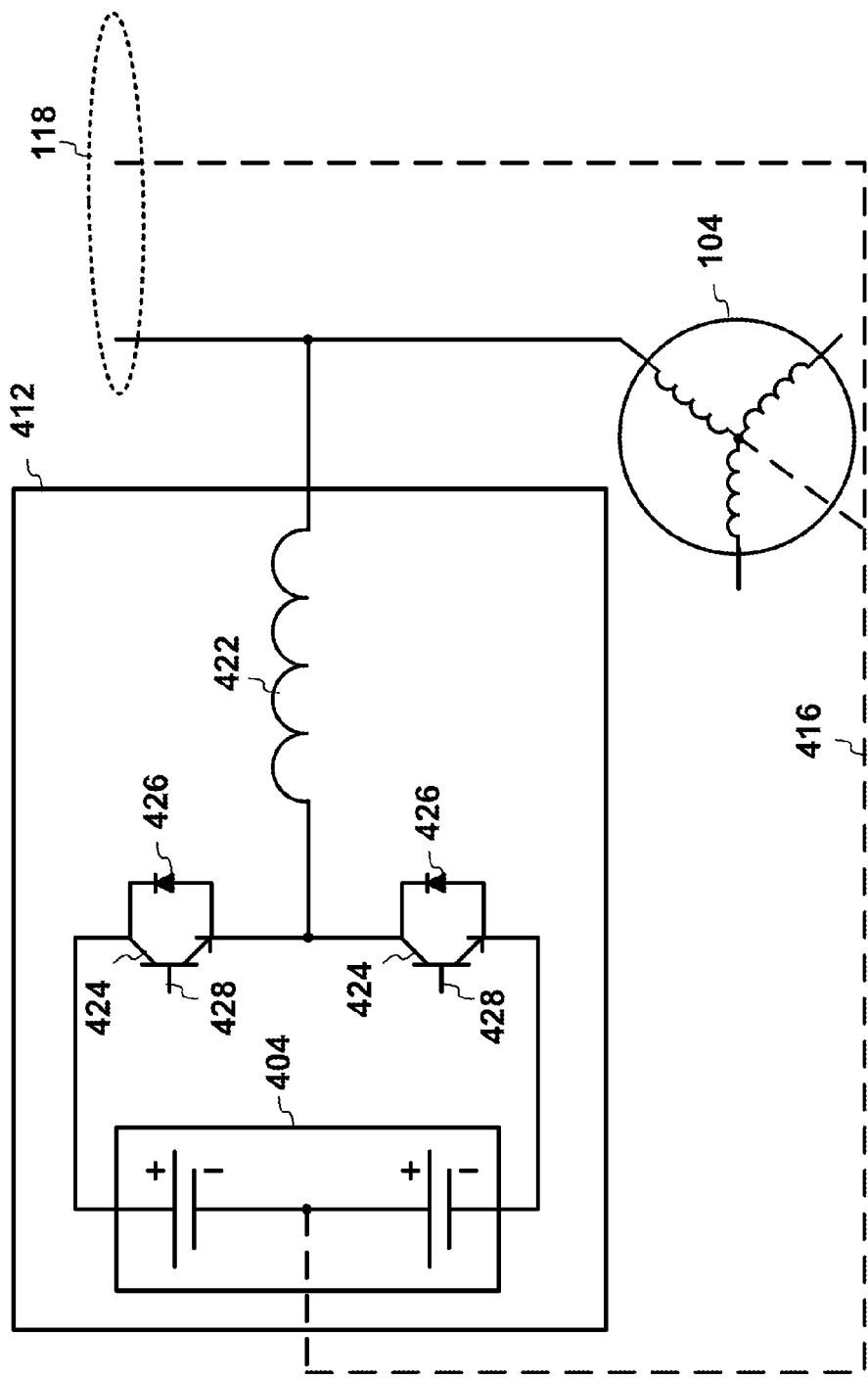
FIG. 5 illustrates a circuit diagram of an example of an AC current source.

FIG. 5 illustrates a circuit diagram of an example of one of the AC current sources 412. The AC current source 412 shown in FIG. 5 includes an inductor 422, two switching devices 424, two diodes 426, and a current source/sink 404. Each of the switching devices 424 is connected in parallel with a corresponding one of the diodes 426. A first one of the switching devices 424 is connected between a first end of the current source/sink 404 and a first end of the inductor 422. Similarly, a second one of the switching devices 424 is connected between a second end of the current source/sink 404 and the first end of the inductor 422. The second end of the inductor 422 is connected to one of the phases of the n-phase supply line 116 that is connected to the motor 104.

Each of the switching devices 424 may be any component having a gate 428 that controls the amount of current that flows through the component. Examples of the switching devices 424 include transistors such as bipolar transistors, n-p-n bipolar transistors, field-effect transistors, and junction gate field-effect transistors.

The current source/sink 404 may be any component that operates as a current sink and/or as a current source. In FIG. 5, the current source/sink 404 comprises two batteries connected in series, where the node connecting the two batteries is connected to the neutral point connection 416. In alternative examples, the current source/sink 404 may be a capacitor. In yet another example the source/sink 404 may be a resistor.

When any of the AC current sources 412 is moving current (in any direction), power flows to or from the source/sink 404. When any of the AC current sources 412 moves current out of the corresponding phase while a voltage on the corresponding phase is positive (with respect to neutral), the AC current source 412 is moving power into the source/sink 404, and the source/sink 404 is sinking power. Alternatively, when any of the AC current sources 412 moves current into the corresponding phase while a voltage on the corresponding phase is positive (with respect to neutral), the AC current source 412 is taking power out of the source/sink 404 and the source/sink 404 is sourcing power. Vice-versa is true whenever the phase is at a negative voltage with respect to the neutral point connection 416.

The source/sink 404 may act as a voltage source for the AC current sources 412 to operate. When in the upper half 310 of the sub-harmonic oscillation 204, the source/sink 404 may sink power (if active). Alternatively, when in the lower half 312 of the sub-harmonic oscillation 204, the source/sink 404 may be sourcing power (if active). If the source/sink 404 includes an energy storage device such as a battery or capacitor, then the source/sink 404 may be capable of both sourcing or sinking, so the source/sink 404 may be actively used in both during the upper half 310 and the lower half 312 of the sub-harmonic oscillation 204.

The gates 428 of the switching devices 424 may be operated complimentary to one another at a desired duty and frequency to achieve the desired current through the inductor 422. Specifically, the gates 428 may be operated so as to generate the damper current 206 through the inductor 422. If the system is balanced, then the neutral point connection 416 may be removed and a single battery or a single capacitor, for example, may be used as the source/sink 404.

Bi-directional power supplies may be used for sourcing and sinking. Accordingly, if the source/sink 404 is a bi-directional power supply, then the source/sink 404 may be used actively during the upper half 310 and the lower half 312 of the sub-harmonic oscillation 204. In such an example, the damper current 206 generated by the AC current source 412 may look like the damper current 206 illustrated in FIG. 2, for example.

Figure 6:
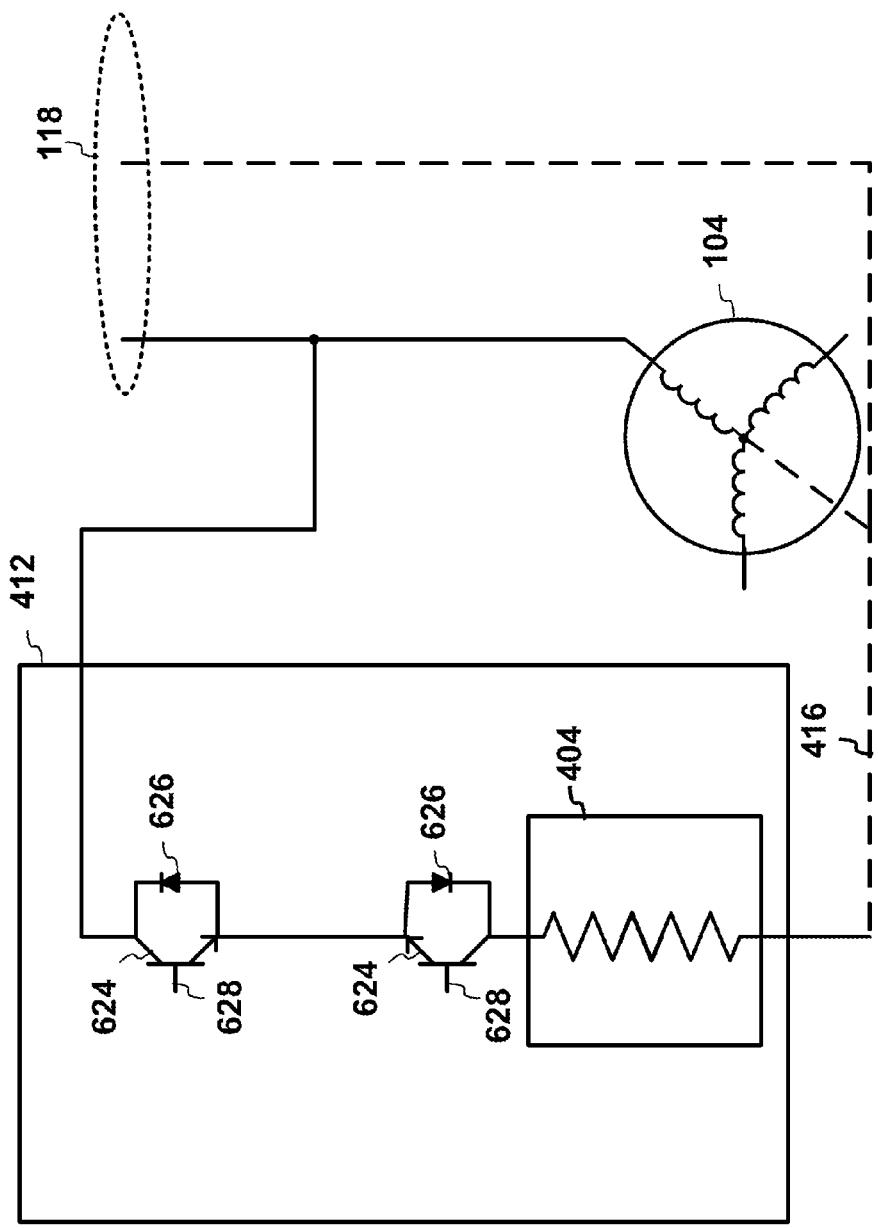
FIG. 6 illustrates a circuit diagram of a second example of an AC current source.
Figure 7:
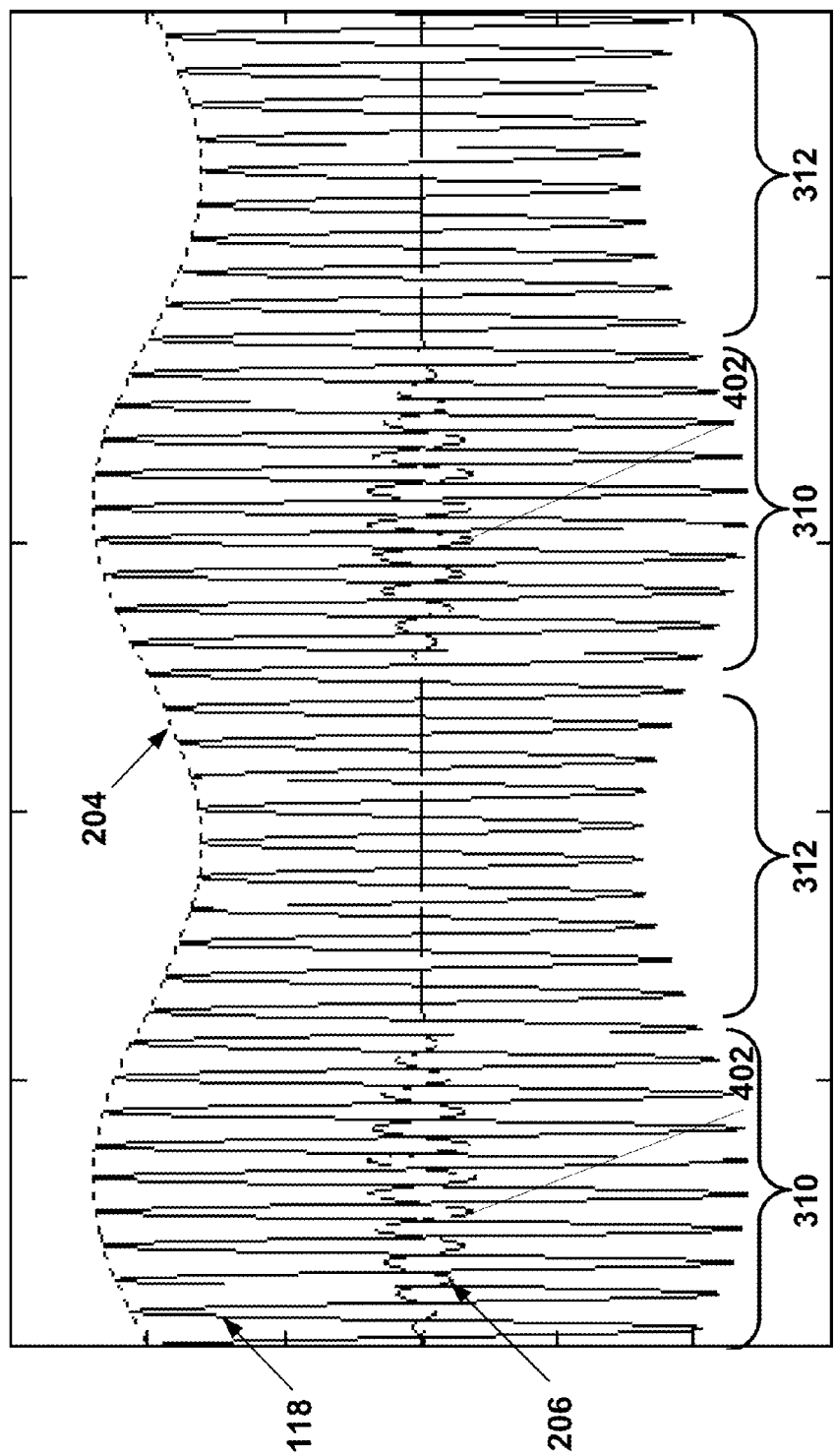
FIG. 7. illustrates an example of a damper current where current is shunted away from a motor during the upper half of a sub-harmonic oscillation but that is zero in the lower half of the sub-harmonic oscillation.

A resistor or other type of load may only be able to sink current. Accordingly, if the source/sink 404 is a resistor or some other type of load, then the source/sink 404 may be used during the upper half 310 of the sub-harmonic oscillation 204, but not in the lower half 312. FIG. 6 illustrates a circuit diagram of an example of one of the AC current sources 412 having a resistor as the source/sink 404. Due to the resistor being the source/sink 404, the AC current source 412 in FIG. 6 may be used during the upper half 310 of the oscillation 204, but not in the lower half 312. Accordingly, the damper current 206 generated by the AC current source 412 in FIG. 6 may look like the damper current 206 shown in FIG. 7. The damper current 206 includes the portion 402 of the current 118 received from the grid 102 on the corresponding phase that is shunted away from the motor 104 and adsorbed by the AC current source 412, but not the compensation current 410.

The AC current source 412 in FIG. 6 is an example of a switchable resistor circuit. The AC current source 412 in FIG. 6 includes two switching devices 624, two diodes 626, and the current source/sink 404, which consists of the resistor. The two switching devices 624 are each connected in parallel with a corresponding one of the two diodes 626. The two switching devices 624 are connected in series, with a first one of the switching devices 624 connected to the corresponding phase of the n-phase supply, and a second one of the switching devices 624 is connected to a first end of the resistor. The second end of the resistor is connected to the neutral point connection 416.

Each of the two switching devices 624 has a corresponding gate 628 that controls current flow through the corresponding switching device 624. The gates 628 may be operated at the desired duty and frequency to achieve the desired current through the resistor 404. Specifically, the gates 628 may be operated so as to shunt the damper current 206 away from the corresponding phase and through the resistor 404. If the system is balanced, then the neutral point connection 416 from all of the AC current sources 412 may be tied together and not connected to the neutral of the motor 104.

Figure 8:
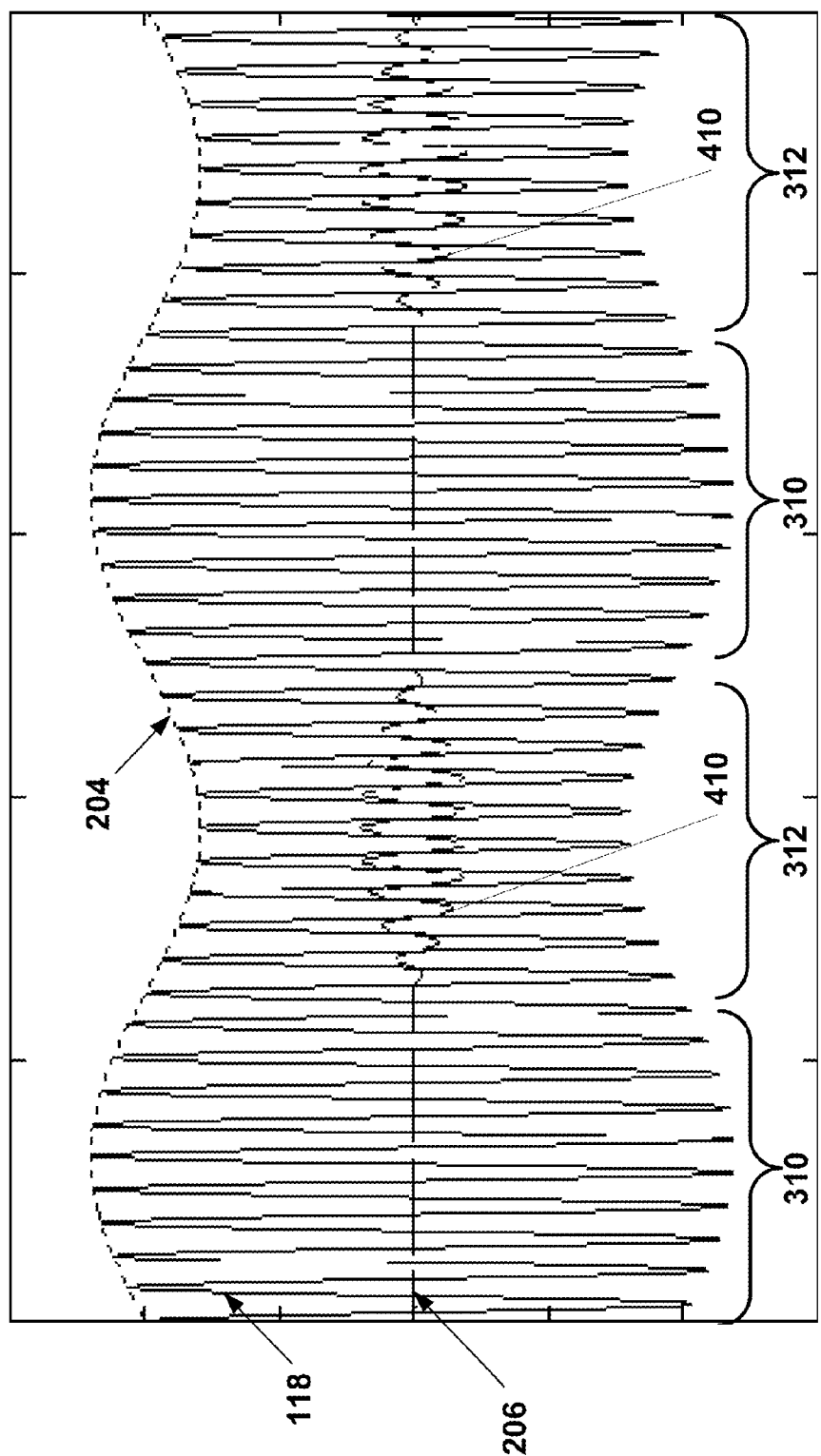
FIG. 8 illustrates an example of a damper current where current is added in the lower half of a sub-harmonic oscillation but is zero in the upper half of the sub-harmonic oscillation.

In contrast to a resistor and a bi-directional power supply, a uni-directional power supply may only be used for sourcing or for sinking, depending on which direction the power supply is capable of directing power. Accordingly, if the source/sink 404 of the current source 412 is a uni-directional power supply capable of supplying power from an external source, then the current source 412 may be used actively during the lower half 312 of the sub-harmonic oscillation 204, but not in the upper half 310. Accordingly, the damper current 206 generated by such an AC current source may look like the damper current 206 shown in FIG. 8. The damper current 206 in FIG. 8 includes the compensation current 410, but not any current shunted away from the motor 104. Conversely, if the source/sink 404 of the current source 412 is a uni-directional power supply capable of sinking power to an external source, then the current source 412 may be used actively during the upper half 310 of the sub-harmonic oscillation 204, but not in the lower half 312. Accordingly, the damper current 206 generated by such an AC current source may look like the damper current 206 shown in FIG. 7. The damper current 206 of FIG. 7 includes the compensation current 402, but not any current sourced into the motor 104.

Each of the AC current sources 412 may be controlled in a similar manner. For example, each of the AC current sources 412 may generate a corresponding damper current that damps the sub-harmonic oscillation 204 in the current 118 in the corresponding phase of the n-phase supply line 116.

In some examples, the damping control circuit 114 may direct the AC current source 412 to reproduce at subscale the oscillating current waveform of the sub-harmonic oscillation 204. The system 100 may be configured to apply the reproduced oscillating current waveform 180 degrees out of phase relative to the oscillating current waveform in the current 118 received from the synchronous AC grid 102. For example, the damping control circuit 114 may direct the AC current source 412 to reproduce the oscillating current waveform 180 degrees out of phase relative to the oscillating current waveform in the current 118 received from the synchronous AC grid 102 on the corresponding phase; the reproduced oscillating current waveform may be added to the current 118 received from the synchronous AC grid 102 on the corresponding phase; and the resultant current is then supplied to the motor 104. In other examples, the damping control circuit 114 may direct the AC current source 412 to reproduce the oscillating current waveform in phase with the oscillating current waveform that is in the current 118 received from the synchronous AC grid 102 on a first one of the phases of a three phase supply; and the reproduced current is added to a different one of the phases of a three phase supply that is 180 degrees out of phase the current 118 received from the synchronous AC grid 102 on the first one of the phases of the three phase supply.

The description above refers to the sub-harmonic oscillation 204. The sub-harmonic oscillation 204 may include multiple sub-harmonic oscillations, each of which may be damped as described above.

Without such damping, sub-harmonic oscillations may grow from a relatively small amount of energy accumulation per cycle. Accordingly, the partial power converter 106 may require, for example, only one to two percent of the power capacity of the motor 104 in order to damp the sub-harmonic oscillations.

As implemented above, the system 100 also may damp nonlinear load modes that occur in some configurations.

Typically the voltage vector will show less variation over time than the current vector. Accordingly, the partial power converter 106 may be or include a current mode 3 phase active rectifier/inverter or any other current controlled 3 phase converter, wherein the n-phase supply line 116 is a 3 phase supply line. Alternatively, the partial power converter 106 may include a bidirectional 3 phase current source with sufficient DC bus capacitance to store the required cycle energy, powered by any other isolated energy storage, or powered by any isolated power source. Alternatively, the partial power converter 106 may include or be any converter that only extracts real power, but such a converter may perform the same features slightly less effectively by only extracting excess power without returning it on the current vector 304, 306 swing away from the angular position of the rotor (for example, the voltage vector).

In some examples, the partial power converter 106 may be configured to correct the power factor (also known as VAR compensation) by shunting reactive currents into or out of the motor 104, so that the shunted currents do not appear in the n-phase supply line 116. The power factor of the system 100 may be the ratio of the real power flowing to the load (for example, the motor 104) to the apparent power in the grid 102. The reactive current detection circuit 122 may receive voltage measurements (not shown) from a voltage sensor (not shown) that measures the voltages on one or more of the phases of n-phase supply line 116. The reactive current detection circuit 122 may also receive the current measurements from the current sensor 110. The reactive current detection circuit 122 may determine a desired reactive current to improve the power factor using any known technique from the current and voltage measurements. The controller 108 may add, for each corresponding phase, the determined reactive current obtained by the reactive current detection circuit 122 to the damper current 206 determined by the damping control circuit 114. The controller 108 may direct the partial power converter 106 to generate the resultant total current. Accordingly, the resultant total current generated by the partial power converter 106 may both damp sub-harmonic oscillations, and shunt reactive power for VAR compensation. Because the partial power converter 106 may only be rated to a partial power level, there is a limit to the amount of reactive power which may be shunted by the partial power converter 106.

Alternatively or in addition, VAR compensation may be addressed by adding one or more inductors and/or capacitors at the input of the motor 104. Adding one or more inductors and/or capacitors at input of synchronous load motors on a weak grid may: (1) compensate for variances in the load motors' open-circuit voltages; (2) reduce reactive current flowing between machines, which increases overall efficiency; (3) reduce the risk of losing synchronization between loads and generator because the currents and torques will be more balanced from load to load and/or (4) relax requirements for loads to be designed and manufactured to within tight back-emf tolerances. One or more of the capacitors and/or the inductors may be dynamically switched on or off. Alternatively or in addition, one or more of the capacitors and/or the inductors may be fixed.

Figure 9:
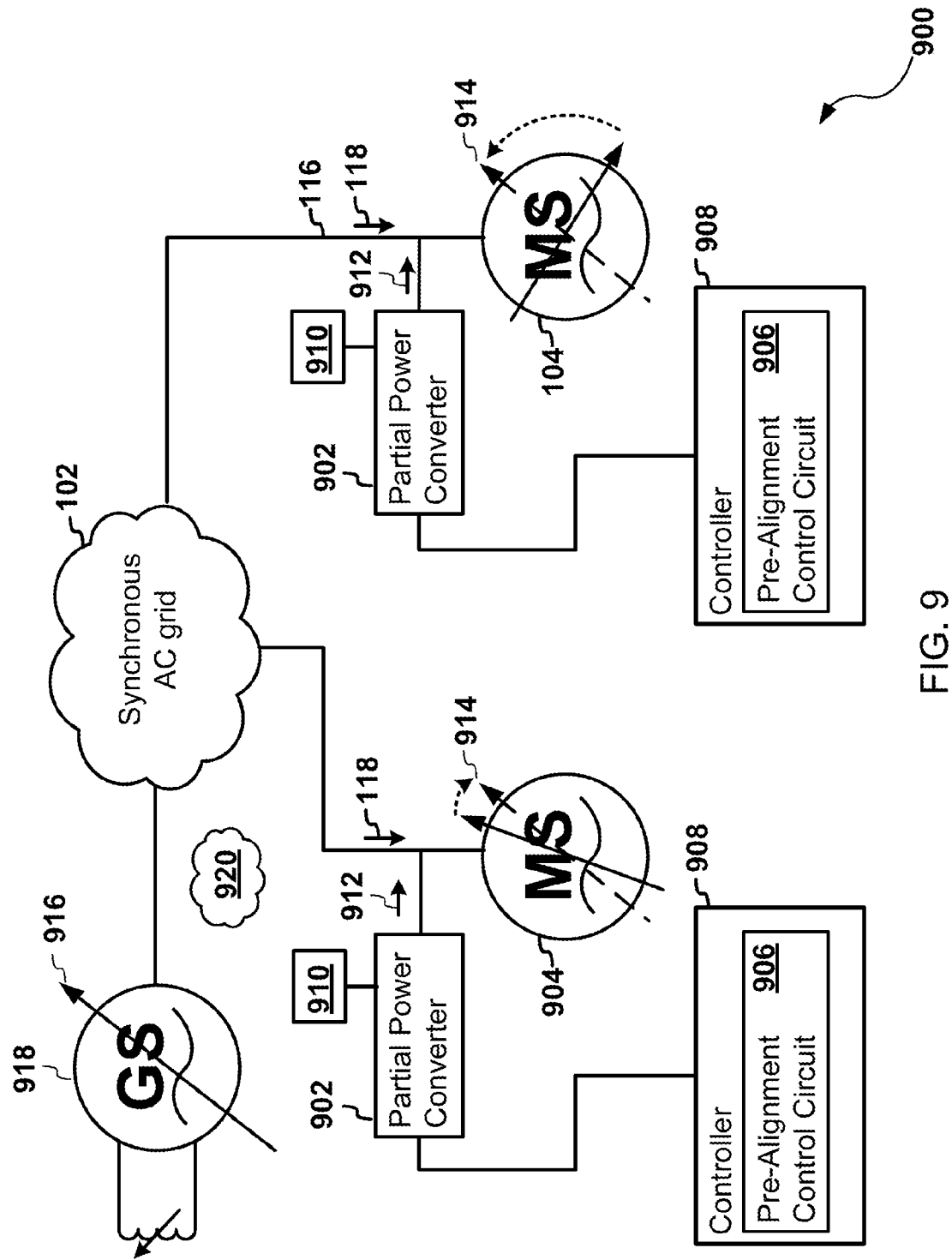
FIG. 9 illustrates a system for pre-aligning rotors of synchronous motors prior to startup of a synchronous AC grid.

FIG. 9 illustrates a system 900 for pre-aligning rotors of the synchronous motors 104 on the synchronous AC grid 102 prior to startup of the motors 104. The system 900 may include one or more synchronous AC motors 104 and 904 that are loads on the synchronous AC grid 102. The system 900 may also include, for each of the motors 104 and 904 (hereafter referred to as the motor 104), a partial power converter 902, a controller 908, and a power source 910 that is isolated the synchronous AC grid 102. The controller 908 may include a pre-alignment control circuit 906.

The motor 104 may be connected to the n-phase supply line 116. Accordingly, the motor 104 is configured to receive polyphase AC power through the n-phase supply line 116 from the grid 102.

The partial power converter 902 may be configured to provide an alignment current 912 through the n-phase supply line 116 to the motor 104. The partial power converter 902 is powered by the power source 910 that is isolated from the synchronous AC grid 102. Although the power source 910 is illustrated as logically separate from the partial power converter 902 in FIG. 9, the power source 910 may be included in the partial power converter 902 in some examples. The isolated power source 910 may include, for example, a battery, a capacitor, a generator, and/or any other power supply electrically isolated from the synchronous AC grid 102.

During operation of the pre-alignment system 900, the controller 908 may determine that the rotor of the motor 104 is to be pre-aligned. Pre-alignment of the rotor refers to an alignment of the rotor made prior to startup of the synchronous AC grid 102. The controller 908 may determine that pre-alignment is to be performed if, for example, the controller 908 determines that the polyphase AC power from the grid 102 is substantially zero for a predetermined length of time. The polyphase AC power is substantially zero when the power is insufficient to move the rotor of the motor 104. Alternatively or in addition, the controller 908 may determine that pre-alignment is to be performed if the controller 908 receives an indication over a communications network 920 that pre-alignment is to be performed.

In response to a determination that pre-alignment is to be performed, the controller 908 may direct the partial power converter 902 to provide the alignment current 912 through the n-phase supply line 116 to the motor 104, where the alignment current 912 causes the rotor of the motor 104 to move to and stop at a target angular position 914. When the partial power converter 902 provides the alignment current 912 to the motor 104, the polyphase AC power from the synchronous AC grid 102 is substantially zero.

The target angular position 914 may be set by the controller 908 to a rotor position of a synchronous machine on the synchronous AC grid 102 that is different than the synchronous AC motor 102. For example, as shown in FIG. 9, the target angular position 914 may be set to a generator rotor position 916 of a generator 918 on the synchronous AC grid 102. In some examples, target angular position 914 may be received over the communications network 920. If the generator rotor position 916 is not available to the controller 908, for example, then the target angular position 914 may be set to a default position. The default position may be a default position for all of the synchronous machines on the synchronous AC grid 102.

The alignment current 912 may include one or more direct current (DC) signals that are applied for a limited time. For example, each of the DC signals may be a pulse signal. Each of the DC signals may be supplied to the motor 104 on a corresponding phase of the n-phase supply line 116. The alignment current 912 may be supplied to the motor 104 at a current vector angle that is selected to align to the rotor of the motor 104 to the target angular position 914. The current vector angle dictates the relative amplitudes of the DC signals in the phases of the n-phase supply line 116. In order to accommodate for a scenario in which the rotor of the motor 104 is initially 180 degrees from the target angular position 914, the controller 908 may slowly sweep the current vector in a first direction for a duration of time, and then in a second direction opposite of the first direction until the target angular position 914 is reached. Alternatively, the controller 908 may slowly sweep the current vector a full revolution and continue sweeping until the target angular position 914 is reached. The magnitude of the current vector needs to be large enough that the mechanical torque produced on the rotor is sufficient to overcome stiction, motor inertia, and any other forces acting against rotation of the rotor. The term "slowly" with respect to the angular speed of the current vector means slow enough that the rotor is able to keep up with the current vector.

After pre-alignment, the rotors of the synchronous motors 104 and 904 on the grid 102 may be at the same position relative to one another—and relative to the generator 918 that powers the grid 102 if the target angular position 914 was set to the generator rotor position 916. The pre-alignment may reduce, in some configurations, the effect of oscillations between loads during start-up of the weak synchronous grid. Alternatively or in addition, the pre-alignment may increase, in some configurations, the torque angle margin available to ensure synchronization is maintained.

The pre-alignment control circuit 906 may implement the pre-alignment logic described above. The pre-alignment control circuit 906 may be included in the controller 908 in some examples, and is not included in the controller 908 in other examples.

The partial power converter 902 may be any power converter configured to provide power on an "as needed basis" as opposed to continuously. The power rating of the partial power converter 902 may be less than the power rating of the load motor 104. The partial power converter 902 may be any electrical or electro-mechanical device for converting electrical energy from one form to another, such changing the voltage, the current, and/or the frequency of electricity received by the partial power converter 902. The partial power converter 902 may be a semiconductor power converter. The partial power converter 902 may include a DC current generator (not shown) for each phase of the n-phase supply line 116. The controller 908 may control the amount of DC current generated by the DC current generators so that the alignment current 912 generated by the partial power converter 902 has a desired current vector angle.

The communications network 920 may be any collection of transmission links over which data between computing nodes may be exchanged. For example, the communications network 920 may include a local area network (LAN), a wired network, a wireless network, a wireless local area network (WLAN), a WI-FI® network (WI-FI is a registered trademark of Wireless Ethernet Compatibility Alliance, Inc. of Austin, Tex.), a personal area network (PAN), a wide area network (WAN), the Internet, an Internet Protocol (IP) network, a proprietary network, and/or any other communications network. In some examples, the communications network 920 may include the synchronous AC grid 102 as the physical layer of the communication network 920.

Figure 10:
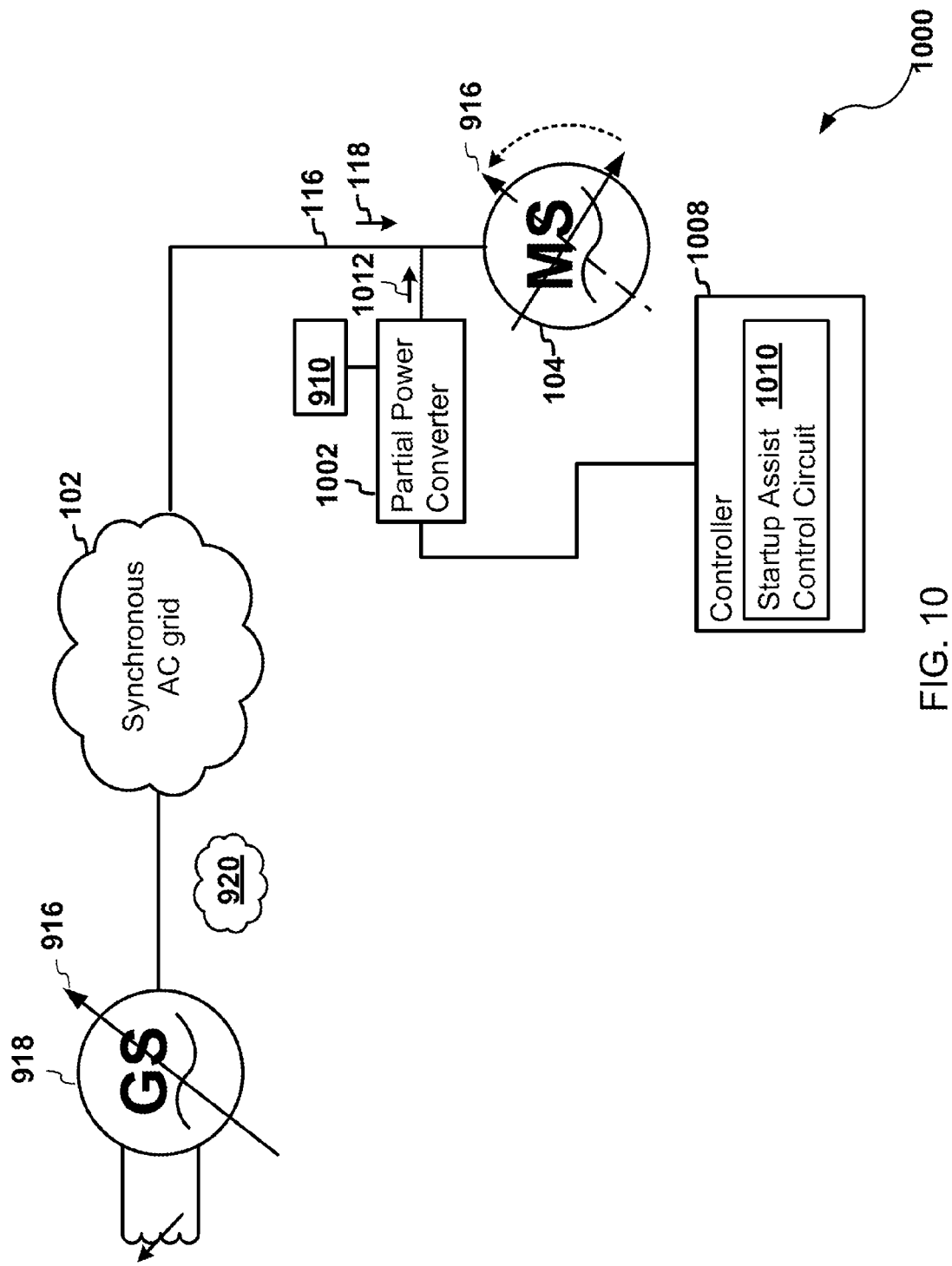
FIG. 10 is a logical block diagram of an example a rotor alignment assistance during startup of a synchronous AC grid.

FIG. 10 illustrates an example of a system 1000 for rotor alignment assistance during startup of the synchronous AC grid 102. The system 1000 may include a partial power converter 1002, a controller 1008, the synchronous motor 104, and the power source 910 that is isolated the synchronous AC grid 102. The controller 1008 may include a startup assist control circuit 1010.

One or more generators, such as the generator 918 illustrated in FIG. 10, may be configured to provide polyphase AC power to the synchronous AC grid 102. The motor 104 may be connected to the n-phase supply line 116. Accordingly, the motor 104 in FIG. 10 is configured to receive polyphase AC power through the n-phase supply line 1116 from the generator 918.

The partial power converter 1002 is configured to provide an alignment current 1012 through the n-phase supply line 116 to the motor 104. The partial power converter 1002 is powered by the power source 910 that is isolated from the synchronous AC grid 102. Although the power source 910 is illustrated as logically separate from the partial power converter 1002 in FIG. 10, the power source 910 may be included in the partial power converter 1002 in some examples. The isolated power source 910 may include, for example, a battery, a capacitor, a generator, and/or any other power supply electrically isolated from the synchronous AC grid 102.

The partial power converter 1002 may be any power converter configured to provide power on an "as needed basis" as opposed to continuously. The power rating of the partial power converter 1002 may be less than the power rating of the load motor 104. The partial power converter 1002 may be any electrical or electro-mechanical device for converting electrical energy from one form to another, such changing the voltage, the current, and/or the frequency of electricity received by the partial power converter 1002. The partial power converter 1002 may be a semiconductor power converter. The partial power converter may include a current generator (not shown) for each phase of the n-phase supply line 116. The controller 1008 may control the amount of current generated by the current generators so that the alignment current 1012 generated by the partial power converter 1008 has a desired magnitude and current vector angle.

During operation of the system 1000 for rotor alignment assistance, the controller 1008 may obtain the generator rotor position 916 of the generator 918. For example, the controller 1008 may receive an indication of the generator rotor position 916 over, for example, the communications network 920. In another example, the controller 1008 may estimate the generator rotor position 916 based on one or more electrical measures using techniques known in the art.

At some point during the operation of the system 1000, the controller 1008 may determine that the startup of the synchronous AC grid 102 has begun. For example, the controller 1008 may detect the startup in response to receiving an indication, such as a command, over the communications network 920 that startup has begun. Alternatively or in addition, the controller 1008 may detect the startup in response to a determination the generator rotor position 916 transitions from being stationary to changing over time. Alternatively or in addition, the startup may be detected if the polyphase AC power increases beyond substantially zero. Any suitable technique for detecting the startup may be used.

Later, the controller 1008 may determine that the startup of the synchronous AC grid 102 is complete using any suitable technique. For example, the controller 1008 may receive an indication that the startup is complete over, for example, the communications network 920. Alternatively or in addition, the controller 1008 may determine that the startup is complete in response to a determination that the rotor of generator 918 and/or the motor 104 reaches a minimum threshold angular speed and the rotors of the generator 918 and the motor 104 are synchronized. The minimum threshold angular speed may be set to any suitable value. For example, the threshold angular speed may be selected so that at or above the minimum threshold angular speed, the rotor of the motor 104 may reliably track changes in the angular speed of the rotor of the generator 918. The minimum threshold angular speed may be selected based on the type of generator and/or motor in some examples. Alternatively or in addition, the controller 1008 may determine that the startup is complete in response to a determination that the current 118 from the synchronous AC grid 102 falls below a predetermined value, which may indicate that only a corresponding predetermined amount of torque is needed to keep the rotor of the motor 104 rotating. Alternatively or in addition, the controller 1008 may determine that the startup is complete in response to detection of a leading power factor. Alternatively or in addition, the controller 1008 may determine that the startup is complete in response to a determination that the rotor of the generator 918 no longer rotates and/or a determination that the polyphase AC power is substantially zero.

During the startup of the grid 102, the rotor of the motor 104, under some conditions, may not be able to accelerate quickly enough to stay synchronized with the rotor of the generator 918. Accordingly, in response to detection of the startup of the grid 102, the controller 1008 may direct the partial power converter 1002 to start providing the alignment current 1012 through the n-phase supply line 116 to the motor 104 during the startup of the grid 102.

Figure 11:
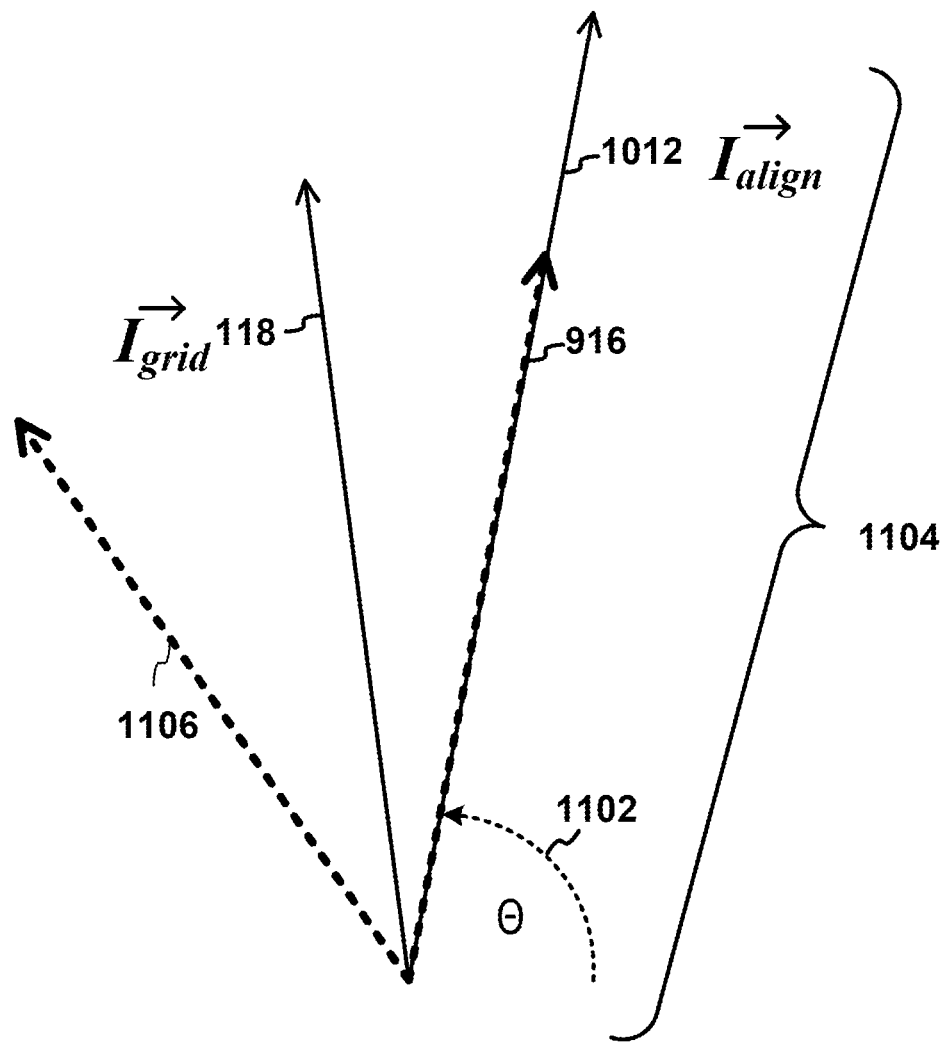
FIG. 11 illustrates an example alignment current at a point in time.

FIG. 11 illustrates the alignment current 1012 at one point in time transformed into a two dimensions using, for example, the Clarke transform. The alignment current 1012 may include one or more current signals (not shown) generated by current sources (not shown) in the partial power converter 1002. Each of the current signals may be supplied to the motor 104 on a corresponding phase of the n-phase supply line 116. The alignment current 1012 may be supplied to the motor 104 and generated by the partial power converter 1002 at a current vector angle 1102 that is selected to align to the rotor of the motor 104 (at motor rotor position 1106) to the generator rotor position 916. The current vector angle 1102 dictates the relative amplitude(s) of the one or more current signals in the phases of the n-phase supply line 116.

At any point in time when the current vector angle 1102 is selected, the current vector angle 1102 may be selected such that the rotor position 1106 (at the motor rotor position 1106) of the rotor of the motor 104 will swing into alignment with the generator rotor position 916 over time if no other currents were flowing through the motor 104, if the generator rotor position 916 were frozen in time, and if the magnitude 1104 of the alignment current 1012 were sufficiently large.

However, the generator rotor position 916 is not frozen in time because the rotor of the generator 918 rotates during the startup of the grid 102. Accordingly, as new values of the current vector angle 1102 are selected, the current vector angle 1102 is selected so that the alignment current 1012 rotates in the two dimensions as the rotor of the generator 918 rotates.

The magnitude 1104 of the alignment current 1012 may be sufficiently large if it is large enough that the resultant mechanical torque overcomes any mechanical forces acting against rotation of the rotor of the motor 104, such as inertia and friction. Accordingly, the magnitude 1104 of the alignment current 1012 may be a predetermined value selected to be large enough under typical conditions. In some examples, the predetermined value may be selected based on the type of the motor 104. If the magnitude 1104 is too small, then the alignment current 1012 may fail to move the rotor. If the magnitude 1104 is too large, then energy may be wasted and/or the motor rotor position 1106 may overshoot the generator rotor position 916.

The controller 1008 may further determine the magnitude 1104 and/or the current vector angle 1102 of the alignment current 1012 based on additional information. For example, the magnitude 1104 may be determined based on the motor rotor position 1106 and inertia of the rotor of the motor 104. The rate of acceleration may be approximately equal to the torque needed to achieve the rate of acceleration divided by rotational inertia of the rotor of the motor 104. The controller 1008 may determine a desired rate of acceleration. The inertia of the rotor may be known in advance. Accordingly, the amount of torque needed to achieve the desired rate of acceleration may be calculated. The magnitude 1104 of the alignment current 1012 may be determined from the calculated torque. Determining the magnitude 1104 in this manner may be more energy efficient than selecting the predetermined value as the magnitude 1104. Alternatively or in addition, the current vector angle 1102 of the alignment current 1012 and the magnitude 1104 may be determined such that torque is produced from the alignment current 1012 in a direction that brings the difference in the motor rotor position 1106 and the generator rotor position 916 towards zero. As another example, if the motor rotor position 1106 and the generator rotor position 916 are known (either via measurement or estimation), then the alignment current angle 1102 and alignment current magnitude 1104 may be selected using well-known machine equations in the two-dimensional reference frame aligned with the motor rotor position 1106. The transformation into this domain may use the well-known Park transformation, for example. The well-known machine equations may be used to determine vector components of the current necessary to produce torque in a direction necessary move the motor rotor position 1106 towards the generator rotor position 916. The knowledge provided by these equations may also identify the vector angle which achieves the best efficiency in moving the motor rotor position 1106 toward the generator rotor position 916. For example, a maximum torque-per-amp characteristic curve may be followed to reduce losses due to resistive heating. The equations may be different for different types of the motor 104. For example, a surface-mounted permanent magnet synchronous motor will typically get the maximum torque-per-amp when the current vector angle 1102 is ninety degrees relative to the rotor magnetic vector, while an interior permanent magnet synchronous motor or a synchronous reluctance motor will typically get the maximum torque-per-amp when the current vector angle 1102 is less than ninety degrees from the rotor magnetic vector (which may be the motor rotor position 1106). The magnitude of the alignment current 1104 may then directly affect the torque magnitude, and may be regulated such that the motor rotor angle 1106 smoothly accelerates towards the generator rotor angle 916, and smoothly decelerates to zero speed as it reaches alignment.

The regulation may be accomplished using a conventional position-tracking control loop such as that found in a servo motor drive.

In response to detecting that the startup of the grid 102 is complete, the controller 1008 may direct the direct the partial power converter 1002 to stop providing the alignment current 1012 to the motor 104. Alternatively or in addition, if the controller 1008 has access the motor rotor position 1106, the controller 1008 may direct the partial power converter 1002 to stop providing the alignment current 1012 to the motor 104 if the rotor of the motor 104 lags the rotor of the generator 918 by more than 180 degrees, but less than 360 degrees. This latter feature may avoid a scenario where the alignment current 102 causes mechanical torque in a direction opposite of the direction of rotation of the rotor of the motor 104.

The startup assist control circuit 1010 may implement the logic of the rotor alignment assistance described above. The startup assist control circuit 101 may be included in the controller 1008 in some examples, but not included in the controller 1008 in other examples.

The systems 100, 900, and 1000 may be implemented in many different ways. Each of the AC current sources 412 in the system 100 for damping oscillations may be a multi-phase controlled AC current source. Sensing of the oscillating currents may be done at the grid-side (as shown in FIG. 1), on the load side (for example, sensing the current that is supplied to the partial power converter 106), or at any node in the system 100 that may detect the oscillating currents. The neutral point connection 416 (shown below as a dotted line in FIG. 4) is optional if the phase currents are balanced. While shown as a wye-connected set of controlled AC current sources 412, these may also be equivalently implemented in a delta configuration. While shown as a 3-phase circuit in FIG. 4, any number of phases may be used.

The controlled AC current sources 412 do not necessarily have to be ideal, sinusoidal current sources. In some examples, the controlled AC current sources 412 may instead be circuits configured to switch in resistors at certain phase positions relative to the oscillation currents in order to remove energy from the oscillations periodically, thereby shunting the portion 402 of the current 118. In such switchable resistor circuits, the ability to store oscillation energy during oscillation peaks may not be needed because the energy from the shunted current is just converted into heat.

In some examples, the partial power converter 106 may be a conventional bridge converter with some relatively small inductance at each bridge output, and a local regulation loop or loops to track the desired AC current in each bridge leg. This may allow the partial power converter 106 to actively and smoothly store energy during peaks (the upper-half 310) of the sub-harmonic oscillation 204, and release the stored energy during minima (the lower-half 312) of the sub-harmonic oscillation 204. A third embodiment may use transistor devices (possibly in an anti-parallel configuration for each phase) in their active region as current sources. The efficiency loss of the devices in their active region may serve as a way of absorbing oscillation energy during oscillation peaks similar to the resistor method, but also have the ability to source some energy from storage or an external supply at other phase points of the oscillation.

In some examples, only a small amount of energy may be needed to be extracted from each sub-harmonic oscillation period in order to effectively damp out the oscillation. The amount of energy loss and/or current flow required by such circuits may be very small. Accordingly, the means used for the controlled AC current sources 412 may be much smaller in weight/volume than a fully-rated converter would be (for example, the partial power converter may only need to be rated three percent of a fully-rated converter providing all of the current to the motor 104). In addition, the thermal loads may be smaller, so cooling in the system 100 may be relatively simple to manage.

Each logic circuit, such as the oscillation detection circuit 112, the damping control circuit 114, the reactive current detection circuit 122, the pre-alignment control circuit 906, and the startup assist control circuit 1010 may be hardware or a combination of hardware and software. For example, each may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each may include memory hardware, such as ROM or RAM, for example, that comprises instructions executable with a processor (such as the controller 108) to implement one or more of the features of logic circuits. When any one of these logic circuits 112, 114, 122, 906, and 1010 includes the portion of the memory that comprises instructions executable with the processor, the logic circuit may or may not include the processor. In some examples, each logic circuit may just be the portion of the physical memory that comprises instructions executable with the processor to implement the features without the logic circuit including any other hardware. Because each logic circuit includes at least some hardware even when the included hardware comprises software, each logic circuit may be interchangeably referred to as a hardware module.

The controller 108, 418, 908, and/or 1008 may be any processor. The processor may be any device that performs logic operations. The processor may include, and/or be in communication with, physical memory. The processor may also be in communication with additional components, such as the partial power converter 106. The processor may include a general processor, a central processing unit, an application specific integrated circuit (ASIC), a digital signal processor, a field programmable gate array (FPGA), a digital circuit, an analog circuit, a microcontroller, any other type of processor, or any combination thereof. The processor may include one or more elements operable to execute computer executable instructions or computer code embodied in memory.

As described above, the implementation of some features may be stored in a computer readable storage medium (for example, as logic implemented as computer executable instructions or as data structures in memory). Such portions of the system 100, 900, and 1000 and the corresponding logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device. However, the computer readable storage medium is not a transitory transmission medium for propagating signals.

The processing capability of the system 100, 900, and 1000 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may be implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

Each component may include additional, different, or fewer components. For example, the partial power converter 106 may include the controller 108 illustrated in FIG. 1, the power converter controller 418 that is in communication with the controller 108, or no controller at all.

In some examples, the controller 108 may not include one or more of the oscillation detection circuit 112, the damping control circuit 114, and the reactive current detection circuit 122. Alternatively or in addition, the partial power converter 106 may include one or more of the oscillation detection circuit 112, the damping control circuit 114, and the reactive current detection circuit 122.

The systems 100, 900, and 1000 may be implemented with additional, different, or fewer components. For example, the system 100 for damping oscillations may include only the oscillation detection circuit 112 and the damping control circuit 114. In another example, the system 100 may include only the damping control circuit 114 and the partial power converter 106. As another example, the system 900 for rotor pre-alignment may include just the controller 908 and the partial power converter 902. As still another example, the system 1000 for rotor alignment assistance may include only the partial power converter 1002 and the controller 1008. Although FIGS. 1 and 10 show just one motor 104 in the system 100 for damping oscillations and the system 1000 for rotor alignment assistance, the systems 100, 900, and 1000 may include two or more synchronous motors.

The systems and methods described herein may be mixed and matched. For example, the system 100 for damping oscillations may be in a first example implementation but not the system 900 for rotor pre-alignment or the system 100 for rotor alignment assistance during startup. In a different example, the system 900 for rotor pre-alignment may be in a second example implementation but not the system 100 for damping oscillations or the system 1000 for rotor alignment assistance during startup. In still another example, the system 100 for damping oscillations and the system 900 for rotor pre-alignment may be in a third implementation, but not the system 1000 for rotor alignment assistance during startup. In yet another example, the system 1000 for rotor alignment assistance during startup may be in a fourth implementation, but not the system 100 for damping oscillations and the system 900 for rotor pre-alignment may be in a third implementation. In another non-limiting example, the system 100 for damping oscillations and the system 1000 for rotor alignment assistance during startup may be in a fifth implementation, but not the system 900 for rotor pre-alignment.

If systems and methods described herein are combined, hardware may be shared in some implementations. For example, the controller 108 in the system 100 for damping oscillations may also serve as the controller 908 in the system 900 for rotor pre-alignment. As another example, the partial power converter 106 in the system 100 for damping oscillations may also serve as the partial power converter 902 of the system 900 for rotor pre-alignment and/or the partial power converter 1002 in the system 1000 for rotor alignment assistance in some implementations. As yet another example, the current source/sink 404 of the damping system 100 may double as the power source 910 of the rotor pre-alignment system 900 and/or the system 1000 for rotor alignment assistance. As a counter example, if the partial power converter 106 in the system 100 for damping oscillations only sinks current and cannot generate positive current, then it may not be used as the partial power converter 902 of the system 900 for rotor pre-alignment or the partial power converter 1002 of the system 1000 for rotor alignment assistance. As another counter example, the partial power converter 106 in the system 100 for damping oscillations may not have a high enough rating to generate the alignment current 912 or 112 needed in the system 900 for rotor pre-alignment and the system 1000 for rotor alignment assistance.

The system 900 for rotor pre-alignment and the system 1000 for rotor alignment assistance during startup are described as aligning rotors in synchronous motors. However, the system 900 for rotor pre-alignment may also align a rotor of generator if the generator configured as a motor. For example, the generator may be configured as a motor by applying a constant current to an exciter of the generator. While applying the constant current to the exciter, the system 900 for rotor pre-alignment may provide the alignment current 912 to the generator like any other synchronous motor.

In some examples, multiple synchronous motors may be modeled as a single motor. Accordingly, one partial power converter 106, 902, 1002 may operate on the modeled motor, thereby operating on multiple synchronous motors at once.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A method to damp oscillations in a synchronous alternating current (AC) grid, the method comprising:
   receiving current from the synchronous AC grid through a phase of a n-phase supply line;
   supplying the current received from the synchronous AC grid to a phase of a synchronous motor;
   detecting a sub-harmonic oscillation in the current received from the synchronous AC grid; and
   damping the sub-harmonic oscillation by:
   shunting a portion of the current away from the phase of the synchronous motor during a first time period in an upper-half of the sub-harmonic oscillation, and/or supplying compensation current from a partial power converter to the phase of the synchronous motor during a second time period in a lower-half of the sub-harmonic oscillation.

2. The method of aspect 1, wherein the compensation current is sinusoidal and has a frequency equal to a fundamental frequency of the synchronous AC grid, and wherein the compensation current is in phase with the current received from the synchronous AC grid.

3. The method of any of aspects 1 to 2, wherein an amplitude envelope of the compensation current is based on an amplitude of the sub-harmonic oscillation.

4. The method of any of aspects 1 to 3, wherein shunting the portion of the current comprises shunting the portion of the current to a neutral point of the n-phase supply line.

5. The method of any of aspects 1 to 4, wherein shunting the portion of the current comprises charging an energy storage device from the shunted portion of the current, and wherein supplying the compensation current comprises sourcing the compensation current from the energy storage device.

6. The method of any of aspects 1 to 5, wherein the shunting and the supplying the compensation current is accomplished by generating a damper current and adding the damper current to the current received from the synchronous AC grid to obtain a resultant current, and supplying the resultant current to the phase of the synchronous motor.

7. The method of aspect 6 comprising generating the damper current to have an amplitude envelope that is determined by the amplitude of the sub-harmonic oscillation.

8. An oscillation damping system comprising:
    an oscillation detection circuit configured to detect a sub-harmonic oscillation in current received through a phase of a n-phase supply line from a synchronous alternating current (AC) grid;
    a partial power converter; and
    a damping control circuit configured to cause the partial power converter to damp the sub-harmonic oscillation, wherein the partial power converter is configured to:
    shunt a portion of the current away from a phase of the synchronous motor during a first time period in an upper-half of the sub-harmonic oscillation, and/or
    supply compensation current to the phase of the synchronous motor during a second time period in a lower-half of the sub-harmonic oscillation, wherein the phase of the synchronous motor receives the compensation current in addition to the current received from synchronous AC grid.

9. The system of aspect 8, wherein the partial power converter is configured to shunt the portion of the current away from the synchronous motor during the first time period in the upper-half of the sub-harmonic oscillation.

10. The system of any of aspects 8 to 9, wherein the partial power converter includes a switchable resistor circuit configured to shunt the portion of the current away from the phase of the synchronous motor during the first time period in the upper-half of the sub-harmonic oscillation.

11. The system of aspect any of aspects 8 to 10, wherein the partial power converter is configured to supply the compensation current to the phase of the synchronous motor during the second time period in the lower-half of the sub-harmonic oscillation.

12. The system of aspect 11, wherein the partial power converter is a semiconductor power converter.

13. The system of any of aspects 8 to 12, wherein the partial power converter is configured to:

shunt the portion of the current away from the phase of the synchronous motor during the first time period in an upper-half of the sub-harmonic oscillation, and
supply compensation current to the phase of the synchronous motor during the second time period in the lower-half of the sub-harmonic oscillation, wherein the synchronous motor receives the compensation current in addition to the current received from synchronous AC grid during the second time period in the lower-half of the sub-harmonic oscillation.

14. The system of aspect 13, wherein the partial power converter is configured to shunt the current away from the synchronous motor and to an energy storage device, and the partial power converter is powered at least in part by the energy storage device.

15. An apparatus for damping non-modal oscillations, the apparatus comprising:
    a partial power converter; and
    a controller configured to:
    detect a sub-harmonic oscillation in current received through a phase of a n-phase supply line from a synchronous alternating current (AC) grid, wherein the phase of the n-phase supply line is electrically coupled to a phase of a synchronous motor; and
    cause the partial power converter to damp the sub-harmonic oscillation, wherein:
    a portion of the current is shunted away by the partial power converter from the phase of the synchronous motor during a first time period in an upper-half of the sub-harmonic oscillation, and/or
    compensation current generated by the partial power converter is added to the phase of the synchronous motor during a second time period in a lower-half of the sub-harmonic oscillation, wherein the phase of the synchronous motor receives the compensation current in addition to the current received from synchronous AC grid during the second time period.

16. The apparatus of aspect 15, wherein the lower-half and/or the upper half of the sub-harmonic oscillation is determined based an indication of an angular position of a rotor of the synchronous motor.

17. The apparatus of any of aspects 15 to 16, wherein a current vector is a transformation into two dimensions of measurements of currents on a plurality of phases of the n-phase supply line, wherein a rotor electrical angle of the motor is a transformation of voltage measurements at the phases of the n-phase supply line into the two dimensions, wherein the rotor electrical angle is the indication of the angular position of the rotor of the synchronous motor.

18. The apparatus of aspect 17, wherein time 1 is a time at which an angle between the current vector and the rotor electrical angle is smallest; time 2 is a time at which the angle between the current vector and the rotor electrical angle is largest, wherein the upper-half of the sub-harmonic oscillation is a time period during which a magnitude of the current vector exceeds a magnitude of the current vector at time 1 and time 2; and the lower-half of the sub-harmonic oscillation is a time period during which the magnitude of the current vector is less than the magnitude of the current vector at time 1 and time 2.

19. The apparatus of any of aspects 15 to 18, wherein the controller is configured to detect reactive current and direct the partial power converter to shunt the reactive current into and/or out of the synchronous motor.

20. The apparatus of any of aspects 15 to 19, wherein the controller is configured to detect the sub-harmonic oscillation in the current received through the phase of the n-phase supply line from an analysis of current received on a different phase of the n-phase supply line.

What is claimed is:

1. A method to damp oscillations in a synchronous alternating current (AC) grid, the method comprising:
   receiving current from the synchronous AC grid through a phase of a n-phase supply line;
   supplying the current received from the synchronous AC grid to a phase of a synchronous motor;
   detecting a sub-harmonic oscillation in the current received from the synchronous AC grid; and
   damping the sub-harmonic oscillation by:
      shunting a portion of the current away from the phase of the synchronous motor during a first time period in an upper-half of the sub-harmonic oscillation, and/or
      supplying compensation current from a partial power converter to the phase of the synchronous motor during a second time period in a lower-half of the sub-harmonic oscillation.

2. The method of claim 1, wherein the compensation current is sinusoidal and has a frequency equal to a fundamental frequency of the synchronous AC grid, and wherein the compensation current is in phase with the current received from the synchronous AC grid.

3. The method of claim 1, wherein an amplitude envelope of the compensation current is based on an amplitude of the sub-harmonic oscillation.

4. The method of claim 1, wherein shunting the portion of the current comprises shunting the portion of the current to a neutral point of the n-phase supply line.

5. The method of claim 1, wherein shunting the portion of the current comprises charging an energy storage device from the shunted portion of the current, and wherein supplying the compensation current comprises sourcing the compensation current from the energy storage device.

6. The method of claim 1, wherein the shunting and the supplying the compensation current is accomplished by generating a damper current and adding the damper current to the current received from the synchronous AC grid to obtain a resultant current, and supplying the resultant current to the phase of the synchronous motor.

7. The method of claim 6 comprising generating the damper current to have an amplitude envelope that is determined by the amplitude of the sub-harmonic oscillation.

8. An oscillation damping system comprising:
   an oscillation detection circuit configured to detect a sub-harmonic oscillation in current received through a phase of a n-phase supply line from a synchronous alternating current (AC) grid;
   a partial power converter; and
   a damping control circuit configured to cause the partial power converter to damp the sub-harmonic oscillation, wherein the partial power converter is configured to:
      shunt a portion of the current away from a phase of the synchronous motor during a first time period in an upper-half of the sub-harmonic oscillation, and/or
      supply compensation current to the phase of the synchronous motor during a second time period in a lower-half of the sub-harmonic oscillation, wherein the phase of the synchronous motor receives the compensation current in addition to the current received from synchronous AC grid.

9. The system of claim 8, wherein the partial power converter is configured to shunt the portion of the current away from the synchronous motor during the first time period in the upper-half of the sub-harmonic oscillation.

10. The system of claim 9, wherein the partial power converter includes a switchable resistor circuit configured to shunt the portion of the current away from the phase of the synchronous motor during the first time period in the upper-half of the sub-harmonic oscillation.

11. The system of claim 8, wherein the partial power converter is configured to supply the compensation current to the phase of the synchronous motor during the second time period in the lower-half of the sub-harmonic oscillation.

12. The system of claim 11, wherein the partial power converter is a semiconductor power converter.

13. The system of claim 8, wherein the partial power converter is configured to:
   shunt the portion of the current away from the phase of the synchronous motor during the first time period in an upper-half of the sub-harmonic oscillation, and
   supply compensation current to the phase of the synchronous motor during the second time period in the lower-half of the sub-harmonic oscillation, wherein the synchronous motor receives the compensation current in addition to the current received from synchronous AC grid during the second time period in the lower-half of the sub-harmonic oscillation.

14. The system of claim 13, wherein the partial power converter is configured to shunt the current away from the synchronous motor and to an energy storage device, and the partial power converter is powered at least in part by the energy storage device.

15. An apparatus for damping non-modal oscillations, the apparatus comprising:
   a partial power converter; and
   a controller configured to:
   detect a sub-harmonic oscillation in current received through a phase of a n-phase supply line from a synchronous alternating current (AC) grid, wherein the phase of the n-phase supply line is electrically coupled to a phase of a synchronous motor; and
   cause the partial power converter to damp the sub-harmonic oscillation, wherein:
   a portion of the current is shunted away by the partial power converter from the phase of the synchronous motor during a first time period in an upper-half of the sub-harmonic oscillation, and/or
   compensation current generated by the partial power converter is added to the phase of the synchronous motor during a second time period in a lower-half of the sub-harmonic oscillation, wherein the phase of the synchronous motor receives the compensation current in addition to the current received from synchronous AC grid during the second time period.

16. The apparatus of claim 15, wherein the lower-half and/or the upper half of the sub-harmonic oscillation is determined based an indication of an angular position of a rotor of the synchronous motor.

17. The apparatus of claim 16, wherein a current vector is a transformation into two dimensions of measurements of currents on a plurality of phases of the n-phase supply line, wherein a rotor electrical angle of the motor is a transformation of voltage measurements at the phases of the n-phase supply line into the two dimensions, wherein the rotor electrical angle is the indication of the angular position of the rotor of the synchronous motor.

18. The apparatus of claim 17, wherein time 1 is a time at which an angle between the current vector and the rotor electrical angle is smallest; time 2 is a time at which the angle between the current vector and the rotor electrical angle is largest, wherein the upper-half of the sub-harmonic oscillation is a time period during which a magnitude of the current vector exceeds a magnitude of the current vector at time 1 and time 2; and the lower-half of the sub-harmonic oscillation is a time period during which the magnitude of the current vector is less than the magnitude of the current vector at time 1 and time 2.

19. The apparatus of claim 15, wherein the controller is configured to detect reactive current and direct the partial power converter to shunt the reactive current into and/or out of the synchronous motor.

20. The apparatus of claim 15, wherein the controller is configured to detect the sub-harmonic oscillation in the current received through the phase of the n-phase supply line from an analysis of current received on a different phase of the n-phase supply line.

\* \* \* \* \*